(12) United States Patent
Relyea et al.

(10) Patent No.: US 8,522,163 B2
(45) Date of Patent: Aug. 27, 2013

(54) SYSTEMS AND METHODS FOR RADIAL DISPLAY OF TIME BASED INFORMATION

(75) Inventors: Donald H. Relyea, Dallas, TX (US); Greg A. Johns, Irving, TX (US); Heath Stallings, Colleyville, TX (US); Brian F. Roberts, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 576 days.

(21) Appl. No.: 12/339,896

(22) Filed: Dec. 19, 2008

(65) Prior Publication Data

US 2010/0157742 A1 Jun. 24, 2010

(51) Int. Cl.
*G06F 3/048* (2013.01)

(52) U.S. Cl.
USPC .......................................... 715/834; 715/963

(58) Field of Classification Search
USPC ................................................. 715/834, 963
See application file for complete search history.

(56) References Cited

U.S. PATENT DOCUMENTS

| | | | |
|---|---|---|---|
| 3,608,214 A * | 9/1971 | Rancati ......................... 434/304 |
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,040 A | 3/1996 | McLaughlin et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,694,376 A * | 12/1997 | Sullivan .......................... 368/82 |

(Continued)

OTHER PUBLICATIONS

"12-hour clock," Wikipedia, http://en.wikipedia.org/wiki/12-hour_clock, 8 pages, accessed from the Internet on Feb. 6, 2009.

(Continued)

*Primary Examiner* — Nicholas Ulrich

(57) ABSTRACT

In certain embodiments, a radial configuration of time based information and a graphical object representative of an event are displayed together in a graphical user interface. A position of the graphical object relative to the radial configuration of time based information in the graphical user interface is configured to indicate a relationship between the event and the time based information. In certain embodiments, the radial configuration of time based information includes a visual representation of an analog clock face, and the graphical object includes a tab positioned along a perimeter of the analog clock face. In certain embodiments, the radial configuration of time based information includes a visual representation of a timeline spirally disposed about at least one axis point, and the graphical object is positioned along a section of the timeline.

23 Claims, 17 Drawing Sheets

(56) References Cited

U.S. PATENT DOCUMENTS

| | | | |
|---|---|---|---|
| 5,701,383 A | 12/1997 | Russo et al. | |
| 5,706,145 A | 1/1998 | Hindman et al. | |
| 5,727,060 A | 3/1998 | Young | |
| 5,734,786 A | 3/1998 | Mankovitz | |
| 5,767,394 A * | 6/1998 | Butts et al. | 73/114.27 |
| 5,790,198 A | 8/1998 | Roop et al. | |
| 5,801,787 A | 9/1998 | Schein et al. | |
| 5,808,608 A | 9/1998 | Young et al. | |
| 5,809,204 A | 9/1998 | Young et al. | |
| 5,812,205 A | 9/1998 | Milnes et al. | |
| 5,828,945 A | 10/1998 | Klosterman | |
| 5,870,150 A | 2/1999 | Yuen | |
| 5,886,746 A | 3/1999 | Yuen et al. | |
| 5,915,026 A | 6/1999 | Mankovitz | |
| 5,923,362 A | 7/1999 | Klosterman | |
| 5,940,073 A | 8/1999 | Klosterman et al. | |
| 5,949,954 A | 9/1999 | Young et al. | |
| 5,959,688 A | 9/1999 | Schein et al. | |
| 5,969,748 A | 10/1999 | Casement et al. | |
| 5,970,206 A | 10/1999 | Yuen et al. | |
| 5,974,222 A | 10/1999 | Yuen et al. | |
| 5,977,974 A * | 11/1999 | Hatori et al. | 715/839 |
| 5,987,213 A | 11/1999 | Mankovitz et al. | |
| 5,988,078 A | 11/1999 | Levine | |
| 5,991,498 A | 11/1999 | Young | |
| 6,002,394 A | 12/1999 | Schein et al. | |
| 6,016,141 A | 1/2000 | Knudson et al. | |
| 6,028,599 A | 2/2000 | Yuen et al. | |
| 6,034,683 A * | 3/2000 | Mansour et al. | 715/764 |
| 6,049,652 A | 4/2000 | Yuen et al. | |
| 6,052,145 A | 4/2000 | Macrae et al. | |
| 6,072,983 A | 6/2000 | Klosterman | |
| 6,075,551 A | 6/2000 | Berezowski et al. | |
| 6,075,575 A | 6/2000 | Schein et al. | |
| 6,078,348 A | 6/2000 | Klosterman et al. | |
| 6,091,882 A | 7/2000 | Yuen et al. | |
| 6,118,492 A | 9/2000 | Milnes et al. | |
| 6,133,909 A | 10/2000 | Schein et al. | |
| 6,137,950 A | 10/2000 | Yuen | |
| 6,144,401 A | 11/2000 | Casement et al. | |
| 6,151,059 A | 11/2000 | Schein et al. | |
| 6,167,188 A | 12/2000 | Young et al. | |
| 6,177,931 B1 | 1/2001 | Alexander et al. | |
| 6,216,265 B1 | 4/2001 | Roop et al. | |
| 6,239,794 B1 | 5/2001 | Yuen et al. | |
| 6,247,176 B1 | 6/2001 | Schein et al. | |
| 6,262,722 B1 | 7/2001 | Allison et al. | |
| 6,263,501 B1 | 7/2001 | Schein et al. | |
| 6,323,911 B1 | 11/2001 | Schein et al. | |
| 6,341,195 B1 | 1/2002 | Mankovitz et al. | |
| 6,341,374 B2 | 1/2002 | Schein et al. | |
| 6,388,714 B1 | 5/2002 | Schein et al. | |
| 6,396,546 B1 | 5/2002 | Alten et al. | |
| 6,412,110 B1 | 6/2002 | Schein et al. | |
| 6,430,358 B1 | 8/2002 | Yuen et al. | |
| 6,430,359 B1 | 8/2002 | Yuen et al. | |
| 6,453,471 B1 | 9/2002 | Klosterman | |
| 6,460,181 B1 | 10/2002 | Donnelly | |
| 6,466,734 B2 | 10/2002 | Yuen et al. | |
| 6,469,753 B1 | 10/2002 | Klosterman et al. | |
| 6,477,705 B1 | 11/2002 | Yuen et al. | |
| 6,498,895 B2 | 12/2002 | Young et al. | |
| 6,505,348 B1 | 1/2003 | Knowles et al. | |
| 6,538,701 B1 | 3/2003 | Yuen | |
| 6,549,719 B2 | 4/2003 | Mankovitz | |
| 6,564,379 B1 | 5/2003 | Knudson et al. | |
| 6,567,606 B2 | 5/2003 | Milnes et al. | |
| 6,588,013 B1 | 7/2003 | Lumley et al. | |
| 6,593,942 B1 * | 7/2003 | Bushmitch et al. | 715/721 |
| 6,668,133 B2 | 12/2003 | Yuen et al. | |
| 6,687,906 B1 | 2/2004 | Yuen et al. | |
| 6,732,369 B1 | 5/2004 | Schein et al. | |
| 6,742,183 B1 | 5/2004 | Reynolds et al. | |
| 6,745,391 B1 | 6/2004 | Macrae et al. | |
| 6,756,997 B1 | 6/2004 | Ward et al. | |
| 6,760,537 B2 | 7/2004 | Mankovitz | |
| 6,799,326 B2 | 9/2004 | Boylan et al. | |
| 6,799,327 B1 | 9/2004 | Reynolds et al. | |
| 6,850,693 B2 | 2/2005 | Young et al. | |
| 6,859,799 B1 | 2/2005 | Yuen | |
| 7,039,935 B2 | 5/2006 | Knudson et al. | |
| 7,069,576 B1 | 6/2006 | Knudson et al. | |
| 7,353,466 B2 * | 4/2008 | Crane et al. | 715/752 |
| 7,418,674 B2 * | 8/2008 | Robbins | 715/848 |
| 7,487,529 B1 | 2/2009 | Orlick | |
| 7,505,374 B2 * | 3/2009 | Booty et al. | 368/223 |
| 7,907,476 B2 * | 3/2011 | Lee | 368/10 |
| 2001/0029610 A1 | 10/2001 | Corvin et al. | |
| 2001/0047298 A1 | 11/2001 | Moore et al. | |
| 2001/0054181 A1 | 12/2001 | Corvin | |
| 2001/0055244 A1 * | 12/2001 | Kim | 368/73 |
| 2002/0073424 A1 | 6/2002 | Ward et al. | |
| 2002/0124255 A1 | 9/2002 | Reichardt et al. | |
| 2003/0005445 A1 | 1/2003 | Schein et al. | |
| 2003/0056219 A1 | 3/2003 | Reichardt et al. | |
| 2003/0110495 A1 | 6/2003 | Bennington et al. | |
| 2003/0110499 A1 | 6/2003 | Knudson et al. | |
| 2003/0115599 A1 | 6/2003 | Bennington et al. | |
| 2003/0115602 A1 | 6/2003 | Knee et al. | |
| 2003/0163813 A1 | 8/2003 | Klosterman et al. | |
| 2003/0164858 A1 | 9/2003 | Klosterman et al. | |
| 2003/0188310 A1 | 10/2003 | Klosterman et al. | |
| 2003/0188311 A1 | 10/2003 | Yuen et al. | |
| 2003/0196201 A1 | 10/2003 | Schein et al. | |
| 2003/0204847 A1 | 10/2003 | Ellis et al. | |
| 2003/0208756 A1 | 11/2003 | Macrae et al. | |
| 2004/0010806 A1 | 1/2004 | Yuen et al. | |
| 2004/0045025 A1 | 3/2004 | Ward et al. | |
| 2004/0107437 A1 | 6/2004 | Reichardt et al. | |
| 2004/0168189 A1 | 8/2004 | Reynolds et al. | |
| 2004/0194138 A1 | 9/2004 | Boylan et al. | |
| 2004/0218472 A1 * | 11/2004 | Narayanaswami et al. | 368/10 |
| 2004/0225966 A1 * | 11/2004 | Besharat et al. | 715/705 |
| 2004/0261098 A1 | 12/2004 | Macrae et al. | |
| 2005/0010949 A1 | 1/2005 | Ward et al. | |
| 2005/0028201 A1 | 2/2005 | Klosterman et al. | |
| 2005/0060667 A1 | 3/2005 | Robbins | |
| 2005/0125823 A1 | 6/2005 | McCoy et al. | |
| 2005/0149964 A1 | 7/2005 | Thomas et al. | |
| 2005/0155056 A1 | 7/2005 | Knee et al. | |
| 2005/0216936 A1 | 9/2005 | Knudson et al. | |
| 2005/0251824 A1 | 11/2005 | Thomas et al. | |
| 2006/0007785 A1 * | 1/2006 | Fernandez et al. | 368/10 |
| 2006/0156336 A1 | 7/2006 | Knudson et al. | |
| 2006/0212894 A1 | 9/2006 | Knudson et al. | |
| 2006/0236269 A1 * | 10/2006 | Borna | 715/963 |
| 2006/0277574 A1 | 12/2006 | Schein et al. | |
| 2006/0288366 A1 | 12/2006 | Boylan et al. | |
| 2007/0016874 A1 | 1/2007 | Chaudhri | |
| 2007/0016926 A1 | 1/2007 | Ward et al. | |
| 2007/0033613 A1 | 2/2007 | Ward et al. | |
| 2007/0060205 A1 * | 3/2007 | Kim | 455/566 |
| 2007/0101284 A1 * | 5/2007 | Shaw et al. | 715/772 |
| 2007/0107010 A1 | 5/2007 | Jolna et al. | |
| 2007/0120856 A1 * | 5/2007 | De Ruyter et al. | 345/440 |
| 2008/0081594 A1 * | 4/2008 | Lee | 455/412.2 |
| 2008/0209546 A1 * | 8/2008 | Kim | 726/19 |
| 2009/0097363 A1 * | 4/2009 | Nyberg | 368/251 |

OTHER PUBLICATIONS

Wellman, "jQuery UI 1.7", ISBN-13: 978-1-847199-72-0, Packt Publishing, 1 page, Nov. 9, 2009.

Balena, "Programming Microsoft Visual Basic 6,0", Microsoft Press, ISBN-13: 978-0-7356-0558-9, pp. 555 and 556, May 26, 1999.

Evjen, et al., "Professional ASP.NET 3.5 AJAX," Wiley/Wrox, ISBN 978-0-470-39217-1, pp. 246-247, Feb. 3, 2009.

* cited by examiner

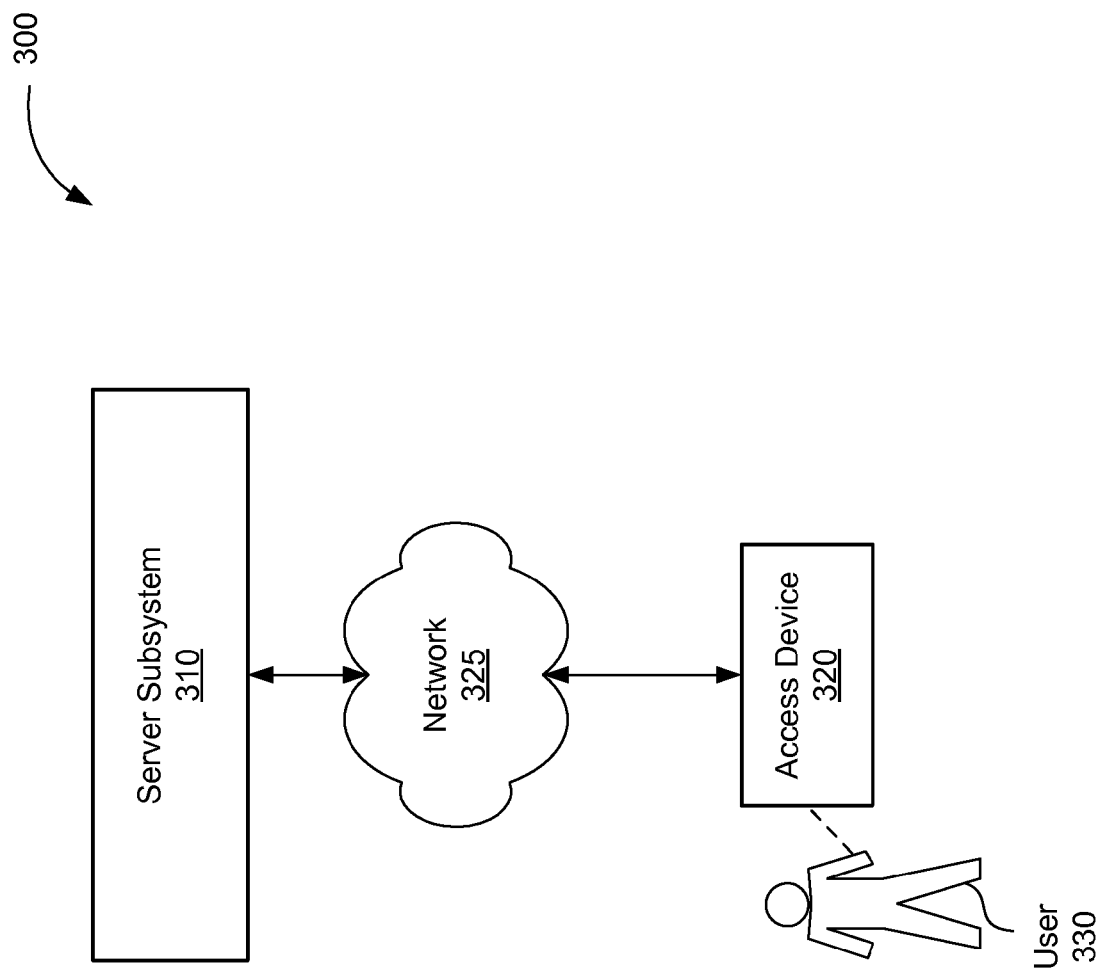

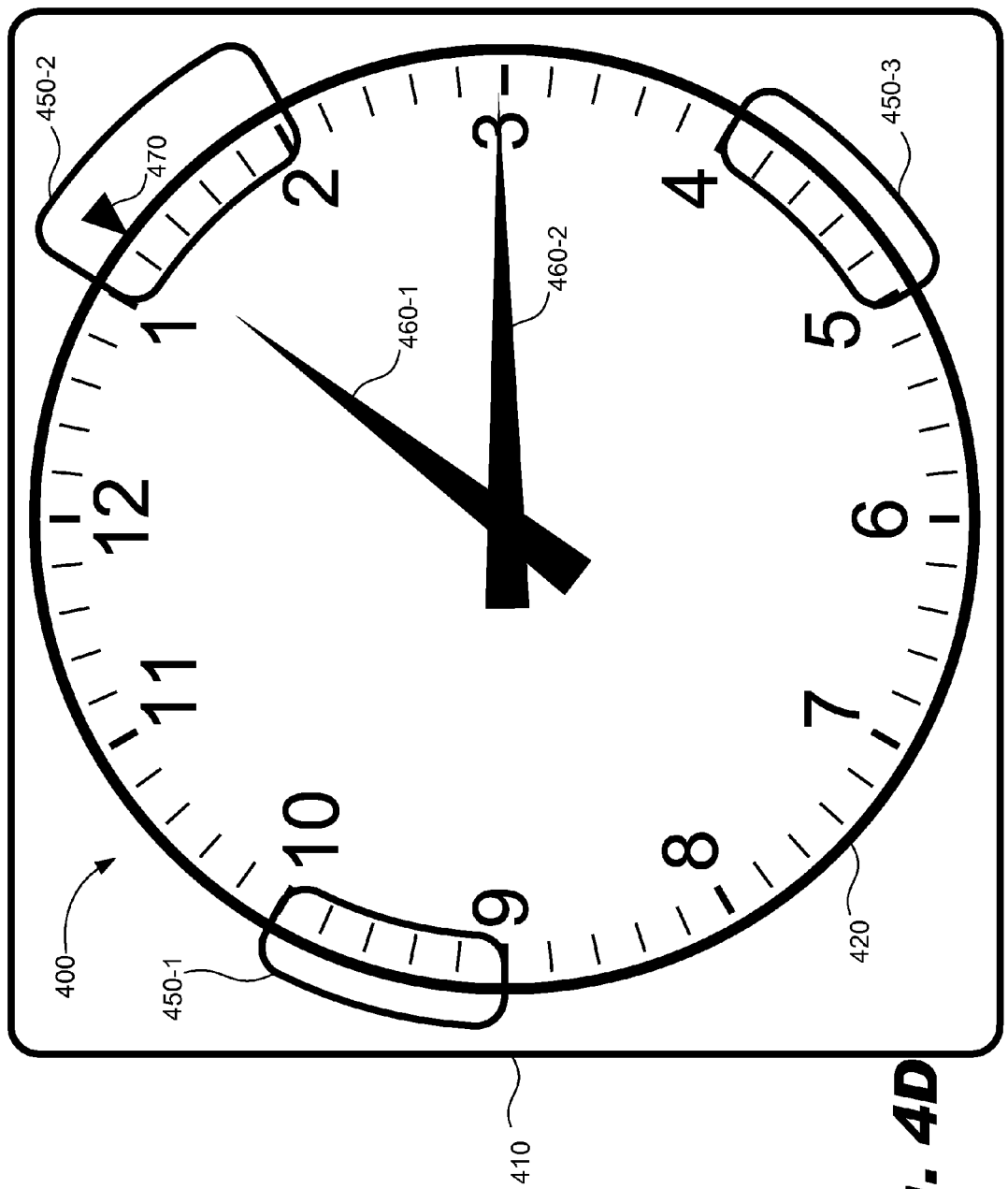

SYSTEMS AND METHODS FOR RADIAL DISPLAY OF TIME BASED INFORMATION

BACKGROUND INFORMATION

Advances in electronic technologies and devices have put a wide variety of applications, features, and information at people's fingertips. The proliferation of such applications, features, and information on electronic devices has challenged designers of user interfaces for the electronic devices. For example, a common challenge has been to design and implement user interface elements that provide an intuitive and appropriate balance of information and functionality. The difficulty of the challenge is exacerbated for electronic devices that have limited resources and/or that are small in size such as a mobile phone device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3 illustrates another exemplary implementation of the system of FIG. 1.

FIGS. 4A-4E illustrate an exemplary radial configuration of time based information and graphical objects representative of events displayed together in a graphical user interface ("GUI").

DETAILED DESCRIPTION OF PREFERRED EMBODIMENTS

Exemplary systems and methods for radial display of time based information are described herein. In certain embodiments, a radial configuration of time based information and a graphical object representative of an event are displayed together in a graphical user interface. A position of the graphical object relative to the radial configuration of time based information in the graphical user interface is configured to indicate a relationship between the event and the time based information. In certain embodiments, the radial configuration of time based information includes a visual representation of an analog clock face, and the graphical object includes a tab positioned along a perimeter of the analog clock face. In certain embodiments, the radial configuration of time based information includes a visual representation of a timeline spirally disposed about at least one axis point, and the graphical object is positioned along a section of the timeline.

Exemplary embodiments of systems and methods for radial display of time based information will now be described in more detail with reference to the accompanying drawings.

Figure 1:
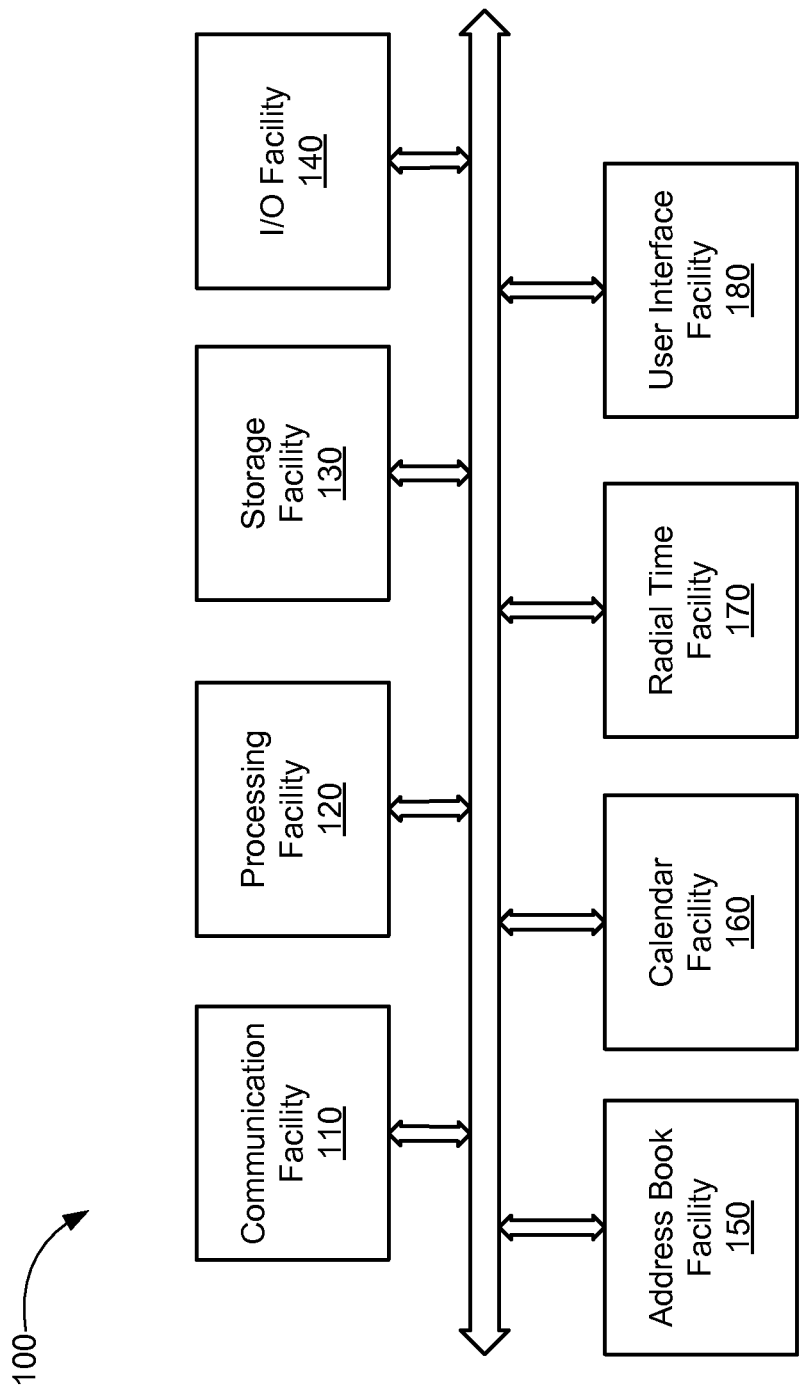
FIG. 1 illustrates an exemplary system configured for radial display of time based information.

FIG. 1 illustrates an exemplary computing system 100 ("system 100") configured for radial display of time based information. System 100 may include a communication facility 110, processing facility 120, storage facility 130, input/output ("I/O") facility 140, address book facility 150, calendar facility 160, radial time facility 170, and user interface facility 180 communicatively coupled to one another as shown in FIG. 1. The components of system 100 may communicate with one another, including sending data to and receiving data from one another, using any suitable communication technologies.

In some examples, system 100, or one or more components of system 100, may include any computing hardware and/or instructions (e.g., software programs), or combinations of computing instructions and hardware, configured to perform one or more of the processes described herein. In particular, it should be understood that system 100, or one or more components of system 100, may be implemented on one physical computing device or may be implemented on more than one physical computing device. Accordingly, system 100 may include any one of a number of computing devices employing any of a number of computer operating systems.

One or more of the processes described herein may be implemented at least in part as computer-executable instructions, i.e., instructions executable by one or more computing devices, tangibly embodied in a computer-readable medium. In general, a processor (e.g., a microprocessor) receives instructions, from a computer-readable medium (e.g., from a memory, etc.), and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computing device can read.

Accordingly, each of the components of system 100 may be implemented as hardware, computing instructions (e.g., software) tangibly embodied on a computer-readable medium, or a combination of hardware and tangibly embodied computing instructions configured to perform one or more of the processes described herein. In certain embodiments, for example, radial time facility 170 may be implemented as one or more software applications embodied on one or more computer-readable media and configured to direct processing facility 120, user interface facility 180, and/or one or more other components of system 100 to execute one or more of the processes described herein.

Figure 2:
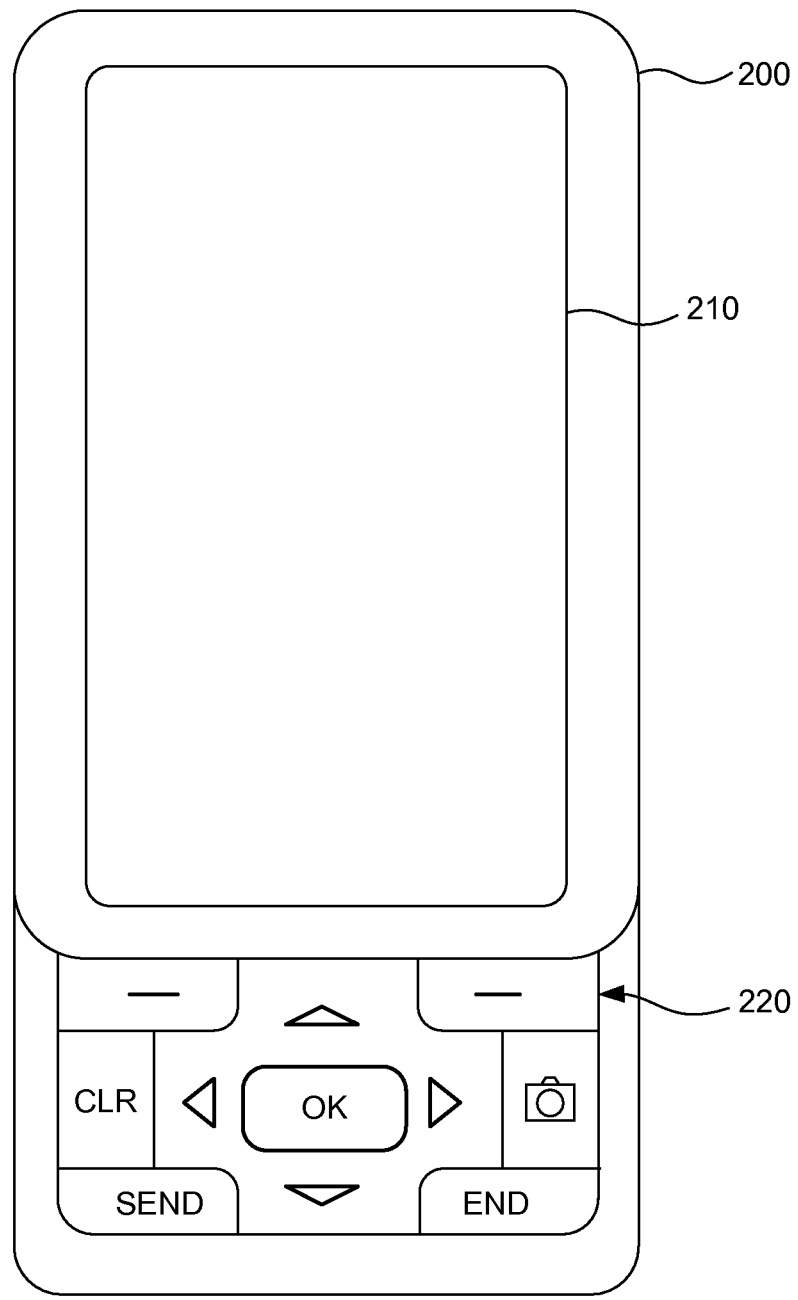
FIG. 2 illustrates an exemplary mobile device having the system of FIG. 1 implemented therein.

System 100 may be implemented as may suit a particular application. FIG. 2 illustrates an exemplary device 200 having system 100 implemented thereon. Device 200 may include one or more of the components of system 100 shown in FIG. 1 and may be configured to perform one or more of the processes and/or operations described herein. Device 200 may include, but is not limited to, a communications device, user device, mobile device (e.g., a mobile phone device), handheld device, computer, phone device (e.g., Verizon Hub device), personal-digital assistant device, set-top box and connected display device (e.g., a television), display device, and any other device configured to perform one or more of the processes and/or operations described herein.

As shown in FIG. 2, device 200 may include a display 210, which may be part of I/O facility 140 and may include one or more display components and technologies configured to display one or more GUIs for viewing by a user of device 200. For example, display 210 may include a display screen configured to display one or more GUIs for viewing by a user of device 200. In certain implementations, the display screen may comprise a touch screen display configured to receive touch input. The touch screen display may employ any suitable single-touch and/or multi-touch touch screen technologies. Examples of GUIs and various GUI views that may be displayed on a display such as display 210 are described in detail further below. In addition to display 210, device 200 may include input mechanisms such as one or more of the input buttons 220 shown in FIG. 2. Input buttons 220 may be part of I/O facility 140.

The implementation of system 100 shown in FIG. 2 is illustrative only. Other embodiments may include alternative implementations. As an example, FIG. 3 illustrates another exemplary implementation 300 of system 100. In implementation 300, components of system 100 may be distributed across a server subsystem 310 and an access device 320 configured to communicate with server subsystem 310 by way of a network 325. Distribution of components of system 100 across server subsystem 310 and access device 320 may be arranged as may suit a particular application. In certain examples, I/O facility 140 and user interface facility 180 may be implemented in access device 320, and one or more of the other facilities may be implemented in server subsystem 310. In other examples, I/O facility 140, radial time facility 170, and user interface facility 180 may be implemented in access device 320, and one or more of the other facilities may be implemented in server subsystem 310. In yet other examples, any component of system 100 may be divided and distributed across server subsystem 310 and access device 320. For instance, radial time facility 170 and/or user interface facility 180 may be divided and distributed across server subsystem 310 and access device 320 in certain embodiments.

Server subsystem 310 may include at least one server with one or more of the components of system 100 implemented thereon, and access device 320 may include any suitable device with one or more components of system 100 implemented thereon. In certain embodiments, for example, access device 320 may include I/O facility 140, or user interface facility 180 and I/O facility 140, such that access device 320 is configured to generate and/or display one of more of the GUIs described herein for viewing by a user 330 of access device. Access device 320 may include, but is not limited to, a communications device, mobile device (e.g., a mobile phone device), handheld device, computing device (e.g., a desktop or laptop computer), phone device (e.g., Verizon Hub device), personal-digital assistant device, set-top box and connected display device, gaming device, wireless communications device, and/or any other device having one or more components of system 100 implemented thereon and configured to perform one or more of the processes described herein.

Network 325 may include one or more networks, including, but not limited to, wireless networks, mobile telephone networks (e.g., cellular telephone networks), closed media networks, subscriber television networks, cable networks, satellite networks, the Internet, intranets, local area networks, public networks, private networks, optical fiber networks, broadband networks, narrowband networks, voice communications networks, Voice over Internet Protocol "("VoIP") networks, Public Switched Telephone Networks ("PSTN"), data communications networks, other communications networks, and any other networks capable of carrying communications and/or data between access device 320 and server subsystem 310. Communications between server subsystem 310 and access device 320 may be transported using any one of above-listed networks, or any combination or sub-combination of the above-listed networks.

Access device 320 and server subsystem 310 may communicate over network 325 using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Returning to FIG. 1, each of the elements shown therein will now be described in additional detail.

Communication facility 110 may be configured to send, receive, and/or otherwise process data representative of or otherwise associated with communication events. As used herein, a "communication event" may include any communication between two or more communication devices and/or between two or more persons or entities ("contacts") by way of the devices. Examples of such communication events may include, but are not limited to, voice communications (e.g., Voice Over IP ("VoIP"), Public Switched Telephone Network ("PSTN"), or other active, attempted, completed, or recorded voice calls and/or messages), text messages (e.g., Short Message Service ("SMS") messages), media messages (e.g., Multimedia Message Service ("MMS") messages), e-mail messages, chat messages (e.g., Instant Messaging ("IM") messages), and subscriber feed messages (e.g., RSS feed messages).

Communication facility 110 may employ any suitable technologies for processing communication events, including sending and/or receiving signals representative of or otherwise associated with communication events over one or more communication networks. As an example, communication facility 110 implemented on device 200 may be configured to send and/or receive signals representative of or otherwise associated with communication events to/from another device over one or more communication networks data.

Communication facility 110 may be configured to maintain data representative of communication events. Such data, which may be referred to as "communications data," may be stored by communication facility 110 and/or on one or more suitable computer-readable media such as storage facility 130. Communications data may include any information descriptive of or otherwise associated with one or more communication events. For example, communications data may include contact information descriptive of contacts associated with communication events (e.g., sender and receiver contact information). Such contact information may include contact identifiers (e.g., contact names), phone numbers, e-mail addresses, and/or other information descriptive of parties to and/or devices associated with communication events. As another example, communications data may include time information associated with communication events, including communication time stamps (e.g., start and end times), communication duration information, and any other information descriptive of time information (e.g., time component) associated with communication events. Communications data may also include device identifiers, routing information, media attachments, communication content, address information, communication status information, communication type indicators, and/or other attributes or information descriptive of or otherwise associated with communication events.

Processing facility 120 may include one or more processors and may be configured to execute and/or direct execution of one or more processes or operations described herein. Processing facility 120 may direct execution of operations in accordance with computer-executable instructions such as may be stored in storage facility 130 or another computer-readable medium. As an example, processing facility 120 may be configured to process data, including demodulating, decoding, and parsing acquired data, and encoding and modulating data for transmission by one of more of the communication facility 110.

Storage facility 130 may include one or more data storage media, devices, or configurations and may employ any type, form, and combination of storage media. For example, the storage facility 130 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Electronic data, including data described herein (e.g., communications data), may be temporarily and/or permanently stored in the storage facility 130.

I/O facility 140 may be configured to receive user input and provide user output and may include any hardware, firmware, software, or combination thereof supportive of input and output capabilities. For example, I/O facility 140 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O facility 140 may include one or more devices for presenting output to a user, including, but not limited to, a graphics engine, a display (e.g., a display screen), one or more display drivers, one or more audio speakers, and one or more audio drivers. Output may include audio, visual, textual, and/or haptic output. In certain embodiments, for example, I/O facility 140 is configured to display one or more GUIs for viewing by a user. Exemplary GUIs and GUI views that may be displayed by I/O facility 140 are described further below.

Address book facility 150 may be configured to maintain an address book including data representative of one or more "contacts." As used herein, a "contact" refers to a person or other entity. Data representative of contacts may be referred to as "contacts data" and may include any information potentially useful for identifying and/or communicating with, or otherwise associated with, one or more contacts, including, but not limited to, contact identifiers (e.g., people's names), street addresses, telephone numbers, e-mail addresses, website addresses, network addresses, Uniform Resource Locators ("URLs"), employment information (e.g., a job title), personal information (e.g., names of family members, important dates, and marital status), etc. In certain embodiments, data associated with a contact may be organized into a profile associated with a person or other entity.

Calendar facility 160 may be configured to manage, track, and/or otherwise process data representative of or otherwise associated with calendar events. As used herein, a "calendar event" may include any event that is or may be associated with a time, time range, day, date, and/or time based schedule. Examples of such calendar events may include, but are not limited to, appointments, meetings, due dates, deadlines, goals, reminders, and any other events that are, were, or may be scheduled.

Calendar facility 160 may be configured to maintain data representative of calendar events. Such data, which may be referred to as "calendar data," may be stored by calendar facility 160 and/or on one or more suitable computer-readable media such as storage facility 130. Calendar data may include any information descriptive of or otherwise associated with one or more calendar events. For example, calendar data may include time information associated with calendar events, including event dates, event start times, event stop times, event durations, estimates of event start times, stop times, and/or durations, event participants, purposes and/or subjects of events, and any other information descriptive of calendar events. As another example, calendar data may include contact information, or links to such information, for participants associated with calendar events.

User interface facility 180 may be configured to generate, or direct processing facility 120 to generate, one or more user interfaces. For example, user interface facility 180 may be configured to generate and provide data representing one or more GUIs to I/O facility 140 for display. In certain embodiments, user interface facility 180 may receive data from radial time facility 170 and utilize the received data to generate a GUI view for display in a GUI. User interface facility 180 may provide data representative of the GUI to I/O facility 140 for display. As mentioned, exemplary GUIs and GUI views are described further below.

Radial time facility 170 may be configured to generate and provide data representative of one or more graphical objects for display in a GUI. For example, radial time facility 170 may provide data representative of one or more graphical objects to user interface facility 180 for inclusion in a GUI that may be displayed by I/O facility 140. For instance, radial time facility 170 may provide data representing a radial configuration of time based information and data representing at least one graphical object representative of at least one event to user interface facility 180 for inclusion in a GUI.

One or more of the graphical objects may be arranged in a GUI to form a radial configuration of time based information. A radial configuration of time based information may include any visually depicted arrangement of time based information having one or more common axes and/or radii. In certain embodiments, for example, a radial configuration of time based information may include time based information arranged generally in a circle, arc, and/or spiral shape. Exemplary radial configurations of time based information are described further below with reference to the drawings.

Certain graphical objects generated and/or provided by radial time facility 170 may be representative of one or more events having a time component. For example, events may include communication events and/or calendar events associated with a time component such as a time of day, time range, or date at which an event occurred, is occurring, or is scheduled to occur. As another example, events may include any past, present, or scheduled or predicted future occurrence.

Graphical objects representative of events may be positioned relative to a radial configuration of time based information in a GUI. The position of a graphical object representative of an event relative to a radial configuration of time based information in a GUI may indicate a relationship between the event and the time based information. For example, a position of a graphical object representative of an event relative to one or more graphical objects representative of a radial configuration of time based information in a GUI may indicate a time of day and/or a time range associated with the event.

Figure 4A:
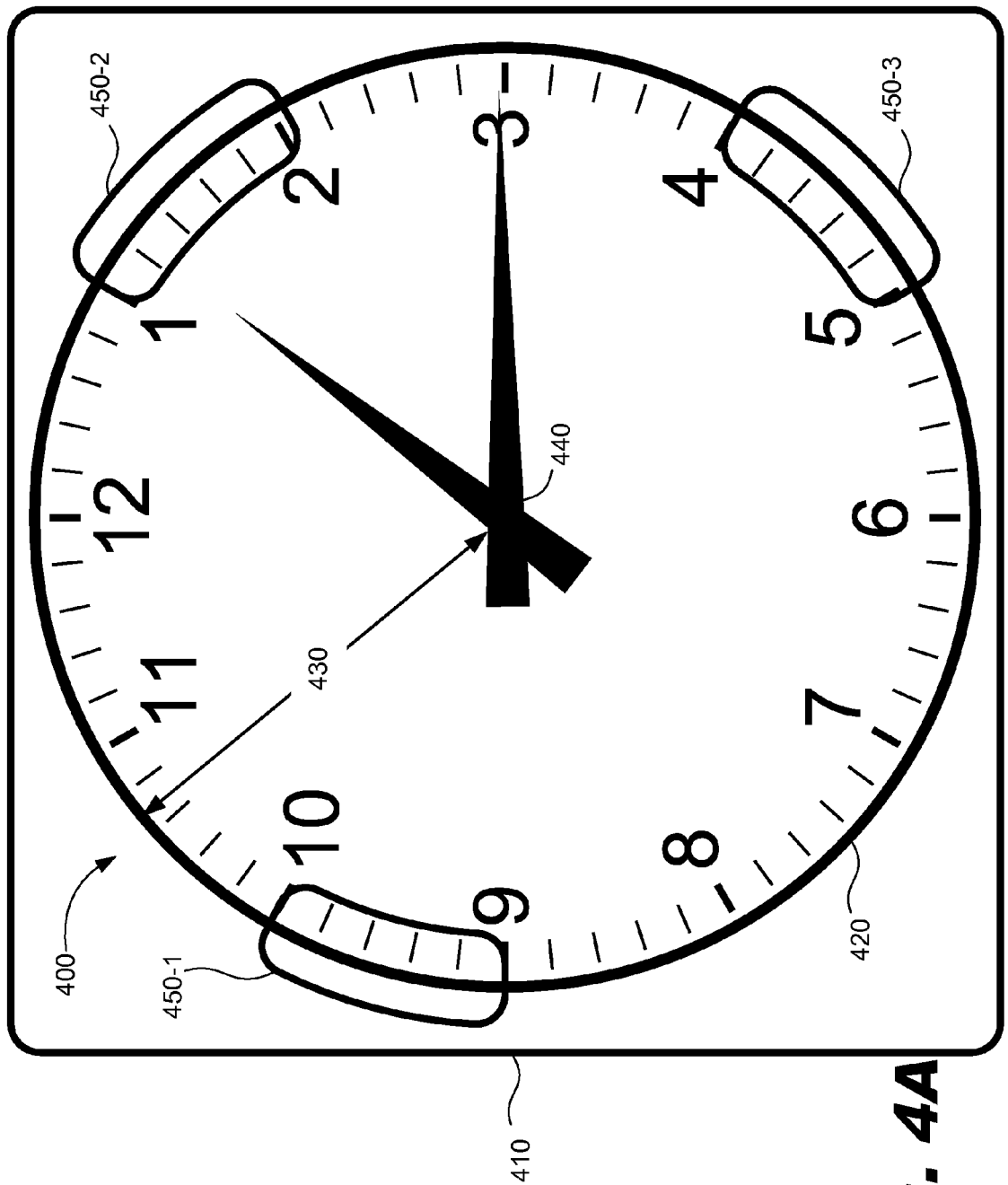
Figure 4B:
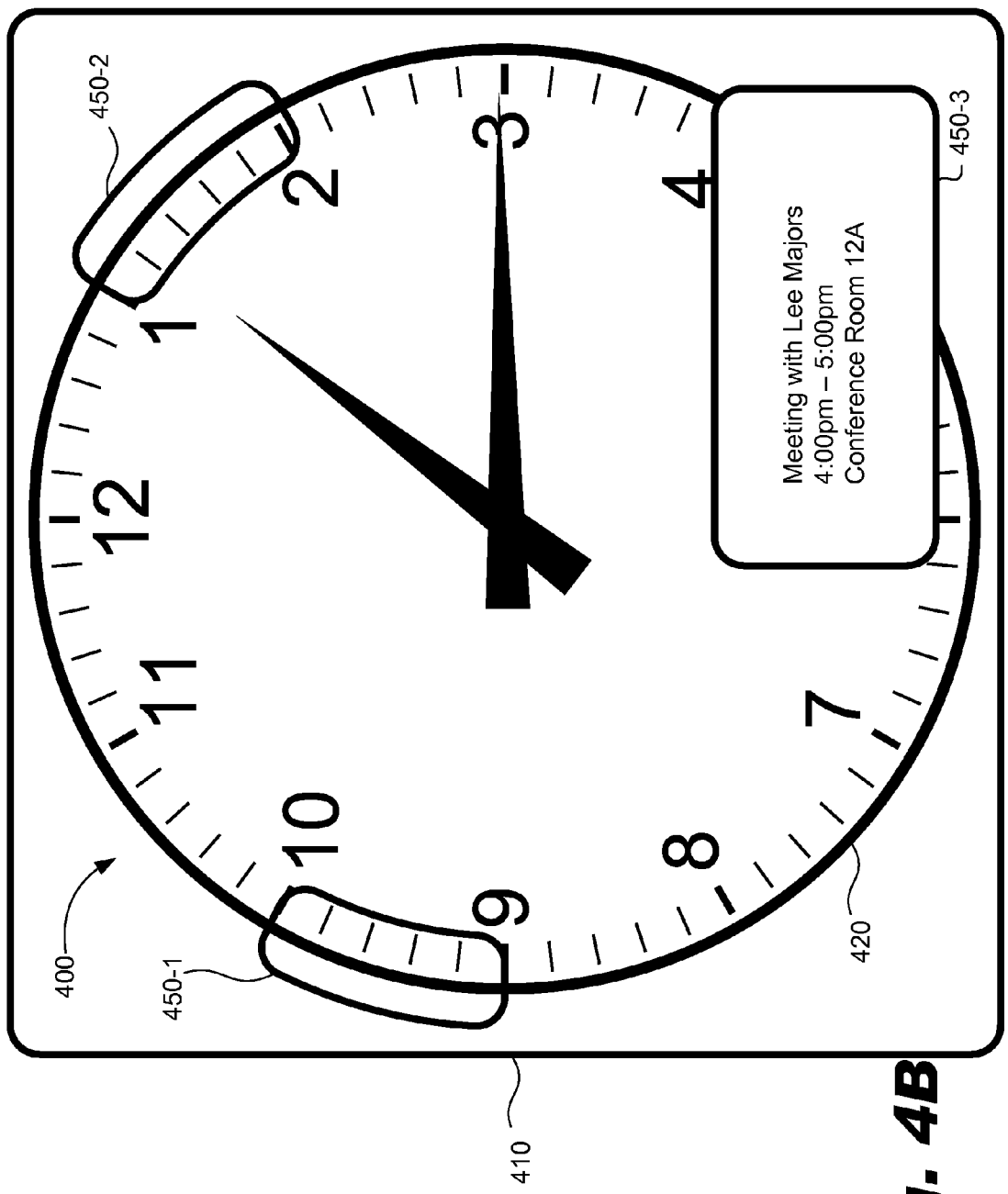
Figure 4C:
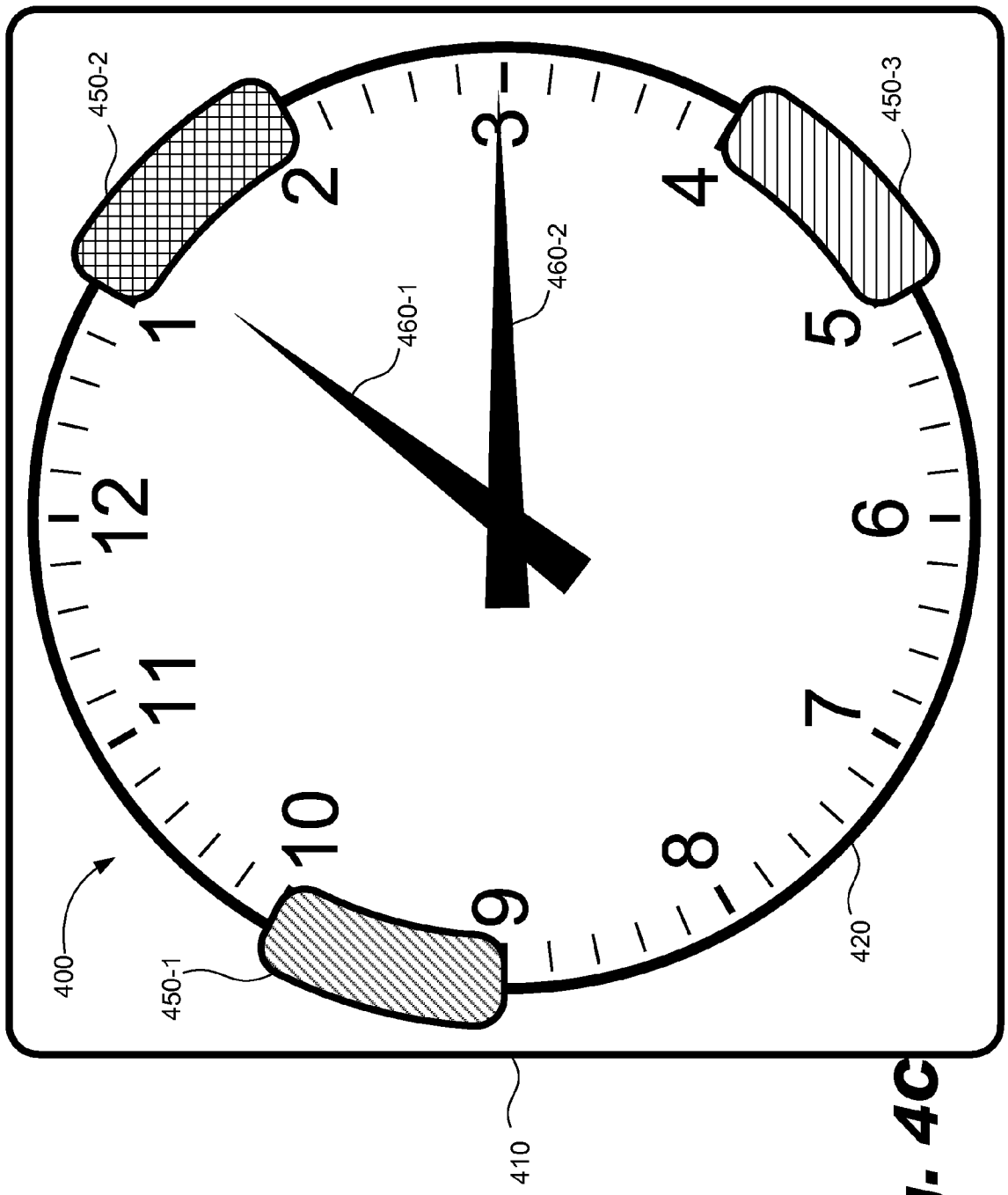

To help facilitate an understanding of radial time facility 170 and radial configurations of time based information, FIGS. 4A-4C illustrate one or more graphical objects arranged to form an exemplary radial configuration of time based information that may be displayed in a GUI. FIG. 4A illustrates an exemplary radial configuration 400 of time based information displayed in a GUI 410. In FIG. 4A, the radial configuration 400 includes one or more graphical objects arranged to form a visual representation of an analog clock face. The analog clock face includes time information radially and uniformly arranged about a perimeter 420 having a common radial distance 430 from a central axis 440. In the illustrated example, time based information includes time-of-day information arranged uniformly about perimeter 420.

FIG. 4A further illustrates graphical objects representative of events displayed in GUI 410. In the illustrated example, such graphical objects include tabs (e.g., tabs 450-1 through 450-3, collectively referred to herein as "tabs 450") positioned in GUI 410 relative to the radial configuration 400 of time based information. In particular, tabs 450 are positioned at certain locations along perimeter 420 of the radial configuration 400 of time based information. The locations at which tabs 450 are positioned indicate relationships with certain time based information. For example, tab 450-1 is positioned at a location indicating a relationship with a certain range of time (e.g., approximately nine o'clock to ten o'clock), tab 450-2 is positioned at a location indicating a relationship with another range of time (e.g., approximately one o'clock to two o'clock), and tab 450-3 is positioned at a location indicating a relationship with yet another range of time (e.g., approximately four o'clock to five o'clock).

As mentioned, each of the tabs 450 may represent or otherwise be associated with an event. Accordingly, the positions of tabs 450 relative to the radial configuration 400 of time based information may indicate relationships between events and time based information (e.g., time-of-day information). For example, a tab 450, which may represent a calendar event, communication event, or any other event having a time component, may visually indicate a relationship of the event to time based information.

In certain embodiments, graphical objects representative of events (e.g., tabs 450) may be user selectable. Accordingly, a user (e.g., a user of device 200) may select a particular tab (e.g., tab 450-3) displayed in GUI 410. The selection may be made in any suitable way and using any suitable form of user input. In certain embodiments, for example, tab 450-3 may comprise a selectable touch object displayed on a touch screen display and that may be selected by a physical object (e.g., a finger or thumb) touching the selectable touch object.

A user selection of a graphical object such as tab 450-3 may be detected in any suitable way, and one or more predetermined actions may be performed in response to a user selection of tab 450-3. In certain embodiments, for example, tab 450-3 may be configured to expand to reveal event information in response to a user selection. For instance, FIG. 4B illustrates tab 450-3 expanded to reveal information descriptive of an event associated with tab 450-3 in GUI 410. In the illustrated example, the information in the expanded tab 450-3 is descriptive of a meeting with a certain person (Lee Majors), at a certain time (4:00 PM-5:00 PM) and at a certain location (Conference Room 12A). The information in the expanded tab 450-3 is displayed within the context of the radial configuration 400 of time based information.

Expansion of a selected tab 450-3 is illustrative of an action that may be performed in response to a user selection of tab 450-3. Other actions may be performed in other embodiments in response to user selections of tabs 450. In certain embodiments, for example, tab 450-3 may comprise a link to a particular GUI view and/or an application associated with an event. For instance, a user selection of tab 450-3 may launch or otherwise access calendar facility 160, which may access and provide a calendar view showing a calendar event associated with tab 450-3. That is, selection of tab 450-3 may navigate a user directly to a calendar view including a calendar event associated with tab 450-3.

Events may include events of distinct types. As used herein, a "type of event" or "event type" may refer to a predefined category of one or more events having one or more common attributes. Examples of predefined categories of events may include, but are not limited to, past events, present events, future events, communication events, calendar events, events associated with a particular person, events associated with a particular group, work related events, family related events, personal events, events having due dates, events labeled "urgent," and/or any other grouping of events based on one or more common attributes.

Any of the event types may be further divided into subgroups. For example, communication events may include distinct types of communication events. In certain embodiments, distinct communication types may include, but are not limited to, a voice communication type, text message communication type, media message communication type, e-mail message communication type, chat message communication type, subscriber feed communication type, or a combination or sub-combination thereof.

Event types may be visually delineated in GUI 410. For example, graphical objects representative of events (e.g., tabs 450) may include one or more visual indicators indicating distinct event types. Event types may be visually depicted by visual indicators in any suitable way, including by graphical objects having certain colors (e.g., hue, saturation, intensity, etc.), shades, patterns, sizes, contrasts, text, symbols, and any other visually discernible indicators. FIG. 4C illustrates an example of tabs 450 having distinct patterns to visually indicate that the tabs 450 represent distinct types of events. In certain embodiments, at least two distinct types of events are represented by graphical objects displayed in GUI 410.

In certain embodiments, past, present, and future events, which may be defined relative to an actual or simulated current time, may be distinguished from one another in GUI 410. For example, distinct colors may be used to visually distinguish past, present, and future events. In some examples, a color band may be associated with the radial configuration 400 of time based information. For instance, a radial color band may be displayed along perimeter 420 of the radial configuration 400. When tabs 450 are positioned along perimeter 420 of the radial configuration 400, one or more colors associated with the radial color band and corresponding to the locations of the tabs 450 may be visually displayed as part of the tabs 450. As an example, a color band may include one or more colors, or gradient of color(s), associated with a position between four o'clock and five o'clock along perimeter 420. When tab 450-3 is displayed at this position as shown in FIG. 4C, the color(s), or gradient of color(s), associated with the position may be displayed within tab 450-3. That is, tab 450-3 may provide a window to a portion of a radial color band associated with radial configuration 400.

The color band may include a color gradient configured to indicate past, present, and future events. In certain embodiments, for example, a red color may be associated with present events. The red color may transition, in gradient fashion, to a blue color associated with future events. Distance into the future may also be indicated by one or more attributes of the blue color. For instance, an event that is farther into the future than another event may be represented with a fuller blue color. In FIG. 4C, the present time is approximately 1:15 PM as indicated by time hands 460-1 and 460-2. Accordingly, tab 450-2 may include a red color indicating that a present time event is currently associated with tab 450-2, and tab 450-3 may include a blue color indicating that a future time event is associated with tab 450-3. In certain embodiments, tab 450-1 may also include a blue color indicating that another future time event is associated with tab 450-1. The blue color associated with tab 450-1 may be fuller than the blue color associated with tab 450-2, which may indicate that an event associated with tab 450-1 is farther into the future than an event associated with tab 450-3. In other embodiments, tab 450-1 may be associated with a past event and may be indicated by yet another color.

The color band may be configured to update based on a passage of time. For example, as an actual time changes over time, colors in the color band may change, or color band may rotate, accordingly to indicate past, present, and future times based on an actual current time.

In certain embodiments, radial configuration 400 may represent a twelve-hour time-of-day view. The twelve hours represented by radial configuration 400 may be selected (e.g., by a user) as may suit a particular application. In some examples, past events may disappear from GUI 410 such that only present and future events are represented in GUI 410. That is, when a present event transitions to a past event with a passage of time, a tab 450 representative of the now past event may disappear from GUI 410. In such an implementation, present and future events associated with a twelve-hour time period may be represented in GUI 410. In the example shown in FIG. 4C, for example, radial configuration 400 may be associated with a twelve-hour time period beginning at 1:00 PM and ending at 12:59 AM the next day. When the actual current time reaches the end of a present event associated with tab 450-2, e.g., 2:00 PM in the present example, tab 450-2 may disappear from GUI 410, and radial configuration 400 may be associated with an updated twelve-hour time period beginning at 2:00 PM and ending at 1:59 AM the next day. In other words, the time based information, a color band or other visual indicators, and tabs 450 associated with radial configuration 400 may be dynamically updated based on a passage of time.

In certain embodiments, radial configuration 400 may include a twenty-four hour time-of-day view. This may be accomplished in any suitable way. In certain examples, visual indicators may be used to distinguish AM and PM. For example, tabs 450 associated with events having time components between 12:00 AM and 11:59 AM may be visually indicated as "AM events," and tabs 450 associated with events having time components between 12:00 PM and 11:59 PM may be visually indicated as "PM events." Visual delineation between AM and PM may be accomplished in any suitable way, including positioning tabs 450 representative of AM events inside of perimeter 420 and tabs 450 representative of PM events outside of perimeter 420, or vice versa.

Alternative or in addition to indicating past, present, and future events, visual indicators may indicate other types of events. For example, visual indicators may distinguish personal and work type events. As another example, visual indicators may distinguish events associated with different people. As yet another example, visual indicators may distinguish communication and calendar events. As yet another example, visual indicators may distinguish distinct types of communication events.

In certain embodiments, radial time facility 170 may be configured to filter events by type for display in GUI 410. The filtering may be performed in response to a user selection of an event type or in response to any other predetermined occurrence. As an example, a user may wish to view only work type events. The user may provide input (e.g., a filter criterion), and radial time facility 170 may respond by filtering events and displaying only tabs 450 associated with work type events in GUI 410.

Alternative or in addition to time hands 460-1 and 460-2, radial configuration 400 may include a different visual indication of a present time. For example, FIG. 4D illustrates a present time indicator 470 displayed at a position associated with present time in radial configuration 400. Present time indicator 470 may include any suitable graphical object such as an arrowhead. In certain embodiments, present time indicator 470 may be positioned along perimeter 420 of the radial configuration 400 as a position associated with a present time. In the illustrated example, the present time is approximately 1:15 PM, and present time indicator 470 is positioned at a position along perimeter 420 that corresponds with 1:15 PM. Present time indicator 470 may move about perimeter 420 as the present time changes with a passage of time.

Radial time facility 170 may be configured to cause one or more graphical objects (tabs 450) representative of one or more events to be visually modified in GUI 410 based on proximities of the graphical objects to a position associated with present time in radial configuration 400. As an example, FIG. 4D illustrates a visual modification of tab 450-2 based on a proximity of tab 450-2 to present time indicator 470. In FIG. 4D, present time indicator 470 is positioned within tab 450-2.

Any visual modification of a graphical object representative of an event may be performed based on proximity to a position associated with present time in radial configuration 400. For example, a graphical object may be iteratively scaled in size (e.g., enlarged) as it approaches a present time position. In the example illustrated in FIG. 4D, tab 450-2 has been stretched radially outward and is consequently comparatively larger in size than tabs 450-1 and 450-3. Alternatively or additionally, a visual modification to tab 450-2 may include changing a color associated with tab 450-2.

Figure 4E:
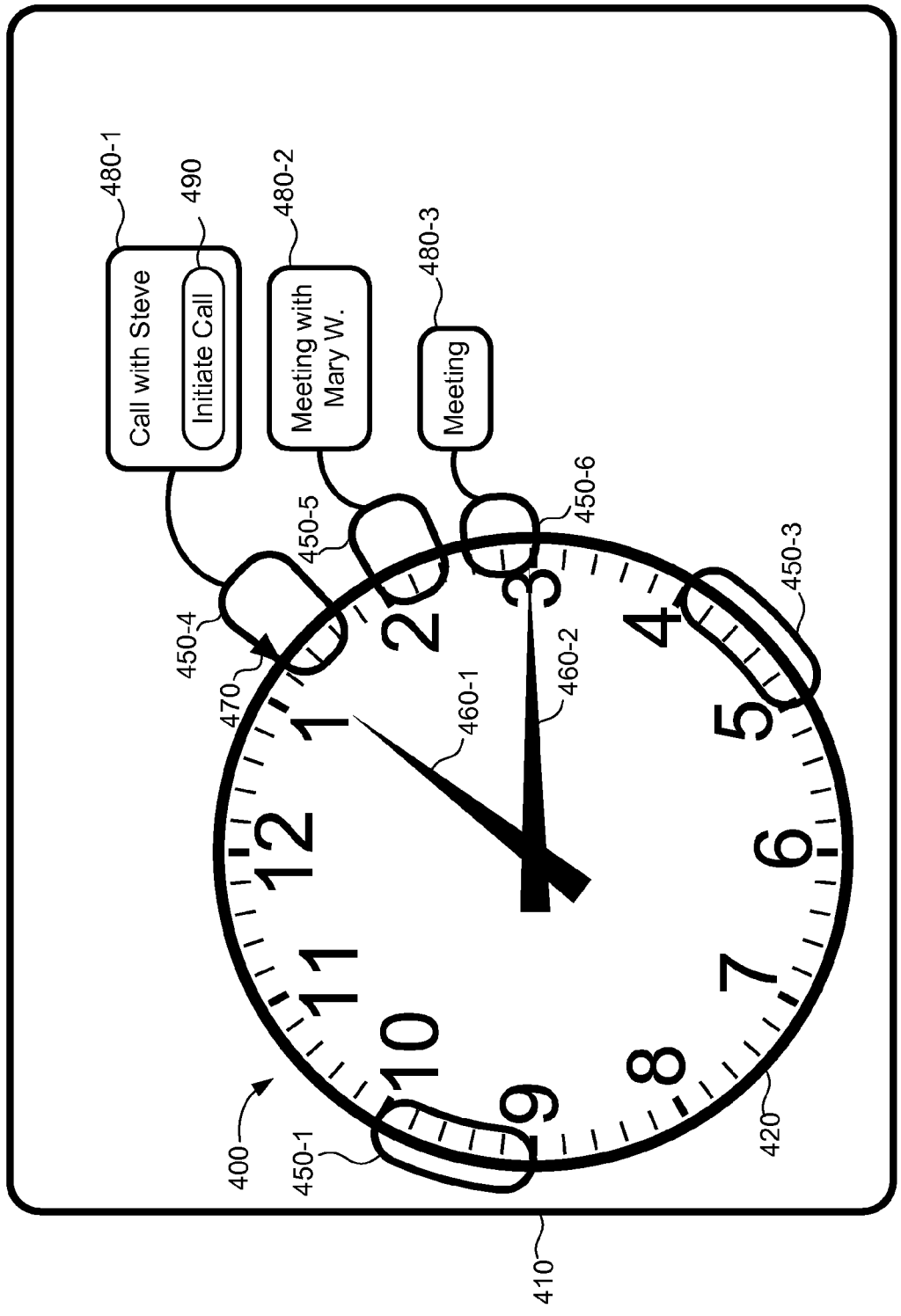

FIG. 4E illustrates another example of graphical objects scaled in size based on proximity to a present time position in radial configuration 400. As shown, radial configuration may include tabs 450-1, 450-3, 450-4, 450-5, and 450-6 positioned along perimeter 420 of radial configuration 400. Tabs 450-4, 450-5, and 450-6 have been scaled in size by radial length compared to tabs 450-1 and 450-3 based on proximity to present time indicator 470. As shown, tabs 450-4, 450-5, and 450-6 have greater radial length than tabs 450-1 and 450-3.

Tabs 450-4, 450-5, and 450-6 also have different radial lengths compared to one another. In particular, of the three tabs 450-4, 450-5, and 450-6, tab 450-4 is positioned nearest to present time indicator 470 and consequently has the largest radial length, tab 450-5 is positioned second nearest to present time indicator 470 and has a radial length that is smaller than that of tab 450-4, and tab 450-6 is positioned third nearest to present time indicator 470 and has a radial length that is smaller in size than that of tab 450-5. In the illustrated example, the sizing of tabs 450-4, 450-5, and 450-6 produces a visual representation of stairs or stepping stones that decrease in radial length with an increase in distance from present time indicator 470 (i.e., events are further in the future).

Radial time facility 170 may be configured to cause one or more extensions objects associated with one or more graphical objects (tabs 450) representative of one or more events to be visually displayed in conjunction with the graphical objects in GUI 410. FIG. 4E illustrates exemplary extension objects (e.g., extension objects 480-1, 480-2, and 480-3, collectively referred to herein as "extension objects 480") displayed in GUI 410. As shown, each of the extension objects 480 may visually extend from a corresponding tab 450. In the illustrated example, extension object 480-1 is associated with and extends from tab 450-4, extension object 480-2 is associated with and extends from tab 450-5, and extension object 480-3 is associated with and extends from tab 450-6.

An extension object 490 may include any suitable graphic(s). In FIG. 4E, each of the extension objects 490 includes a bubble-like graphic connected to a corresponding tab by an extension line. In some examples, information and or graphics associated with an event may be displayed within a bubble-like graphic of an extension object. Other suitable graphics may be employed in other embodiments.

An extension object 480 may include a display of information descriptive of or otherwise associated with an event. For example, extension object 480-1 displays information descriptive of an event (e.g., a scheduled "call with Steve") that is represented by tab 450-4. Extension object 480-1 may provide a way to visually display additional information about an event and may be especially useful when a tab 450-4 representative of the event is visually small in size in GUI 410.

Alternative or in addition to information descriptive of an event, an extension object 480 may include at least one actionable object. An actionable object may be selected by a user to initiate a particular action or process. As an example, extension object 480-1 includes an actionable object 490 that when selected is configured to initiate an action associated with an event. In particular, a call to a device associated with a person named Steve may be initiated when a user selects actionable object 490. One or more actionable objects such as actionable object 490 may be included in one of more the extension objects 480.

In certain embodiments, radial time facility 170 may be configured to selectively make an actionable object 490 available to a user based on proximity of an event to present time. That is, an extension object 490 may be selectively displayed based on a proximity of a graphical object (a tab 450) associated with the extension object 490 to a position representative of time in radial configuration 400. For example, when present time indicator 470 reaches tab 450-4 in radial configuration 400, actionable object 490 may be displayed in extension object 480-1.

Extension objects 480 may be visually modified based on proximities of corresponding tabs 450 to a present time position in radial configuration 400. For example, sizes of extension objects 490 may be modified, such as by increasing the size of an extension object 490 as present time indicator 470 approaches a tab 450 corresponding to the extension object 490. In FIG. 4E, the sizes of extension objects 480-1, 480-2, and 480-3 progressively descreases as distance from present time indicator 470 increases.

Figure 5:
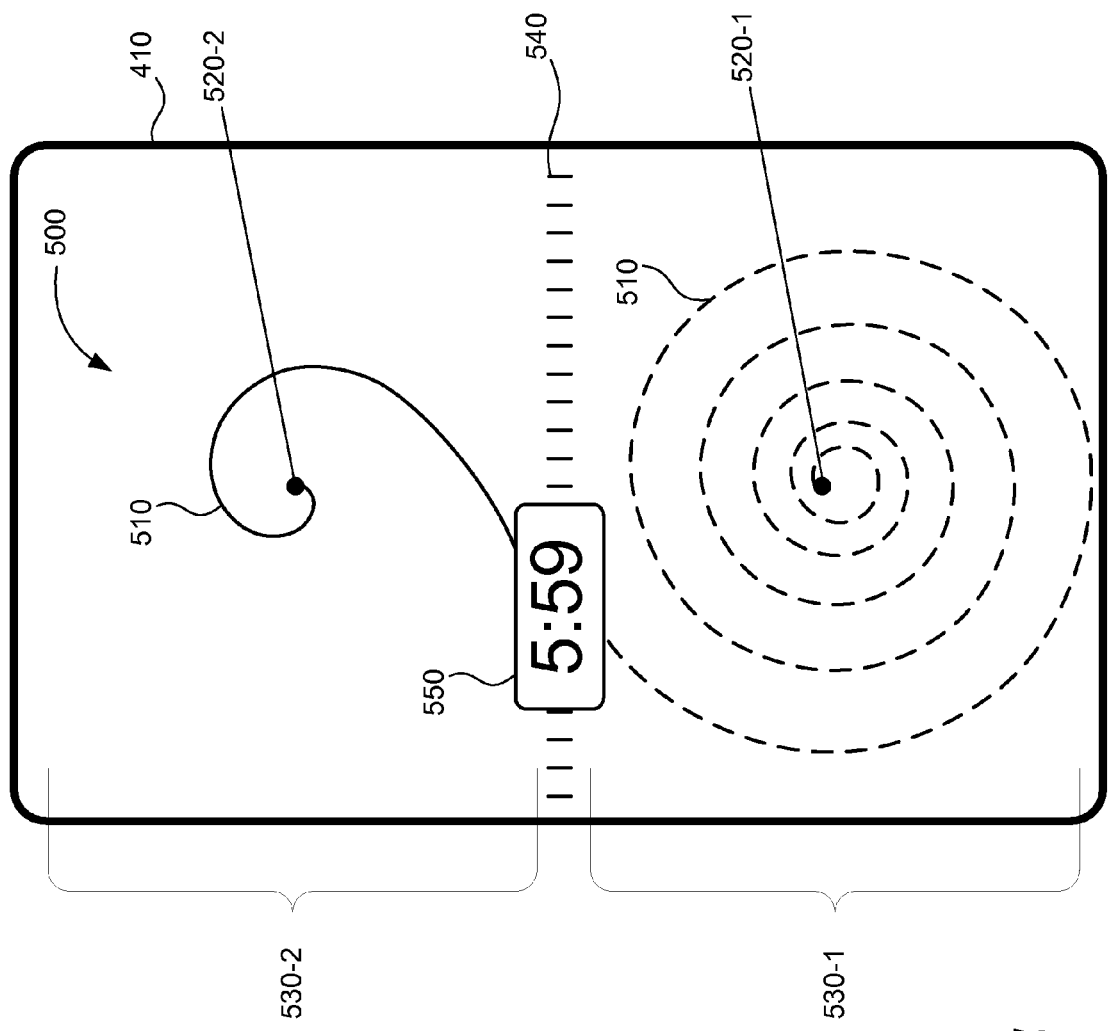
FIG. 5 illustrates another exemplary radial configuration of time based information.

While an exemplary radial configuration 400 of time based information has been described, the example is illustrative only. Other radial configurations of time based information may be provided in other embodiments. For example, FIG. 5 illustrates another exemplary radial configuration 500 of time based information displayed in a GUI 410. As shown in FIG. 5, radial configuration 500 may include a visual representation of a timeline 510 configured to wind about one or more axis points (e.g., axis points 520-1 and 520-2) in a radial manner. In particular, timeline 510 may spirally wind about at least one axis point to form at least one spirally-shaped timeline 510 disposed (e.g., coiled) about the axis point(s). In FIG. 5, a first section 530-1 of timeline 510 is spirally coiled about a first axis point 520-1, and a second section 530-2 of timeline 510 is spirally coiled about a second axis point 520-2. In the illustrated example, the first section 530-1 of the timeline 510 is represented as a dashed line coiled about axis point 520-1, and the second section 530-2 of the timeline 510 is represented as a solid line coiled about axis point 520-2.

The first 530-1 and second 530-2 portions of timeline 510 may be visually and/or relationally connected to one another. For example, as the timeline 510 is graphically wound about axis point 520-2, the timeline 510 may be correspondingly graphically unwound from about axis point 520-1. Such graphical scrolling of timeline 510 (e.g., winding about axis point 520-2 and unwinding from about axis point 520-1) may represent and/or be based on a passage of time. In such an embodiment, axis point 520-1 and first section 530-1 of timeline 510 may represent future time, and axis point 520-2 and second section 530-2 of timeline 510 may represent past time.

In certain embodiments, timeline 510 may be configured to represent approximately a twenty-four hour time period, or one day. In such embodiments, axis point 520-2, which may be referred to as a "past axis," may represent 12:00 AM, and axis point 520-1, which may be referred to as a "future axis," may represent 11:59 PM.

In certain embodiments, a connection of first 530-1 and second 520-2 sections of timeline 510 may be at a location in GUI 410, which location may be visually indicated in GUI 410. In certain examples, the first section 530-1 of timeline 510 may represent future time based information, the second section 530-1 of timeline 510 may represent past time based information, and the location of the connection of the first 530-1 and second 530-2 sections of timeline 510 may represent present time based information.

As shown in FIG. 5, GUI 410 may further include graphics representative of a horizon 540 displayed in GUI 410 so as to separate the first 530-1 and second 530-2 sections of timeline 510. In the illustrated example, horizon 540 is visually depicted with graphical objects arranged in a generally horizontal row across GUI 410. In certain embodiments, horizon 540 may be positioned approximately halfway between axis points 520-1 and 520-2 and may represent present time. The location at which the first 530-1 and second 530-2 sections of timeline 510 connect together may be at a position along horizon 540. Horizon 540 may be referred to as "event horizon 540" when graphical objects representative of events are displayed together with timeline 510 in GUI 410, as described further below.

Horizon 540 may visually represent a location in GUI 410 at which a point on timeline 510 may transition from the first section 530-1 to the second section 530-2 of the timeline 510. In certain embodiments, the transition from the first section 530-1 to the second section 530-2 of the timeline 510 may represent a transition from future time to past time. For example, an intersection of timeline 510 with horizon 540 may represent present time. Accordingly, with the passage of time, a point on timeline 510 may transition from the first section 530-1 of timeline 510 that is representative of future time to a position intersecting horizon 540 that is representative of present time. The same point on timeline 510 may then transition from the position intersecting horizon 540 that is representative of present time to the second section 530-2 of timeline 510 that is representative of past time.

Horizon 540 may visually depict a linear and/or generally horizontal time line representative of approximately a same time period as represented by timeline 510. For instance, in examples in which timeline 510 represents approximately a twenty-four hour time period, horizon 540 may represent approximately the same twenty-four hour time period. Hence, where axis point 520-2 represents 12:00 AM and axis point 520-1 represents 11:59 PM, a left-most point of horizon 540 in GUI 410 may represent 12:00 AM and a right-most point of horizon 540 in GUI 410 may represent 11:59 PM. In certain examples, a location of an intersection of timeline 510 and horizon 540 in GUI 410 may be based on a time associated with the intersecting points. That is, timeline 510 may intersect horizon 540 at various positions along horizon 540 based on a time associated the point on timeline 510 that is intersecting horizon 540. Examples of timeline 510 and horizon 540 intersecting at various positions along horizon 540 are described further below.

In certain embodiments, GUI 410 may include a selectable object such as a magnification window 550 ("MAG window 550"), which may be configured to display a current time (e.g., "5:59" in FIG. 5). The current time and/or other contents of the MAG window 550 may be magnified compared to other graphical objects in GUI 410. In certain embodiments, MAG window 550 may be positioned along (e.g., anchored to) horizon 540, such as at the location at which timeline 510 intersects horizon 540, as shown in FIG. 5. This location typically also represents a point at which the first 530-1 and second 530-2 sections of timeline 510 connect as described above.

MAG window 550, or other selectable object, may be configured to move along horizon 540. Movement of MAG window 550 along horizon 540 may be detected and the timeline 510 scrolled in accordance with the movement. For example, timeline 510 may scroll by winding about past axis point 520-2 (e.g., in a counter-clockwise direction) and correspondingly unwinding about future axis point 520-1 (e.g., in a clockwise direction) when the movement is in a first direction (e.g., from left to right) along horizon 540. Conversely, timeline 510 may scroll by unwinding from about past axis point 520-2 (e.g., in a clockwise direction) and correspondingly winding about future axis point 520-1 (e.g., in a counter-clockwise direction) when the movement is in a second direction (e.g., from right to left) along horizon 540. As timeline 510 scrolls in this manner, the position at which timeline 510 and horizon 540 intersect may change, with the intersection point moving along horizon 540.

Figure 6:
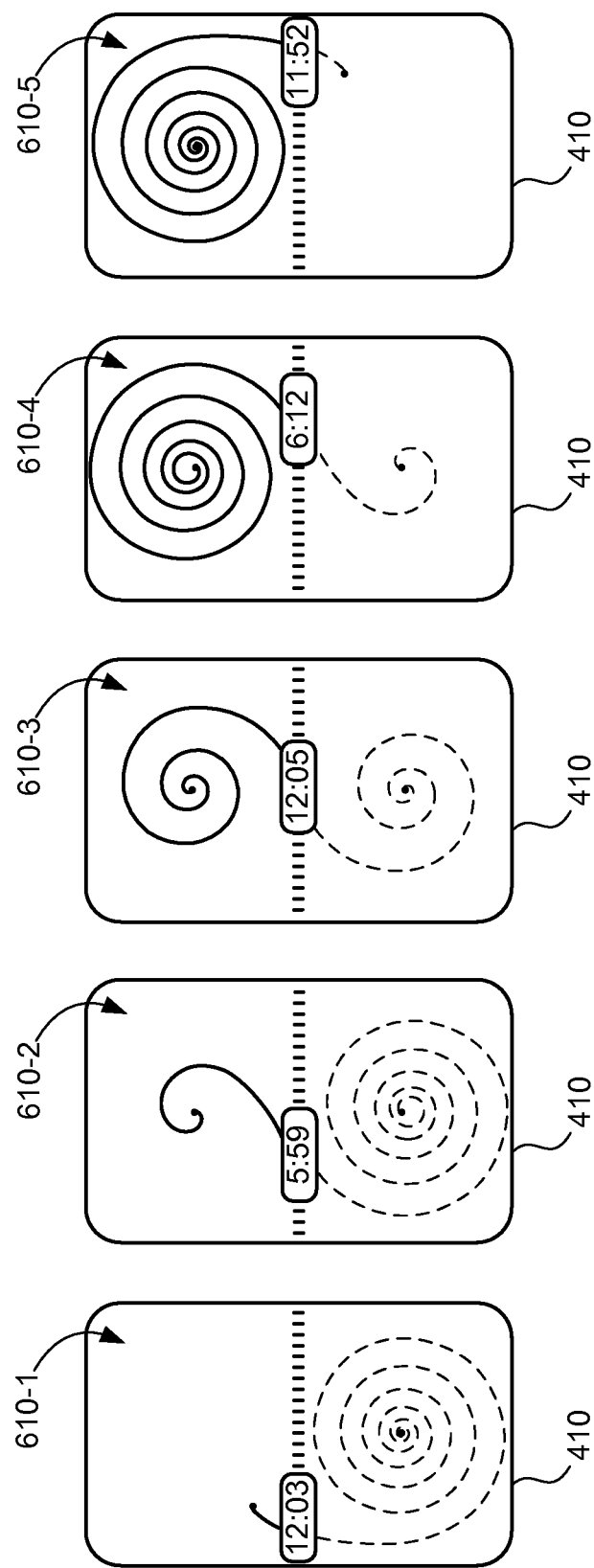
FIG. 6 illustrates a sequence of GUI views representative of updates to the radial configuration of FIG. 5 based on passage of time.

FIG. 6 illustrates a series of several GUI views (e.g., GUI views 610-1 through 610-5) representative of movement of timeline 510 and MAG window 550 with a passage of time. In the illustrated example, timeline 510 represents approximately a twenty-four hour time period beginning at 12:00 AM and ending at 11:59 PM. In FIG. 6, GUI view 610-1 illustrates timeline 510 and MAG window 550 as they may be displayed in GUI 410 when a current time is 12:03 AM, GUI view 610-2 illustrates timeline 510 and MAG window 550 as they may be displayed in GUI 410 when the current time is 5:59 AM, GUI view 610-3 illustrates timeline 510 and MAG window 550 as they may be displayed in GUI 410 when the current time is 12:05 PM, GUI view 610-4 illustrates timeline 510 and MAG window 550 as they may be displayed in GUI 410 when the current time is 6:12 PM, and GUI view 610-5 illustrates timeline 510 and MAG window 550 as they may be displayed in GUI 410 when the current time is 11:52 PM.

Movement of timeline 510 and MAG window 550 in GUI 410, such as that illustrated in FIG. 6, may represent natural or artificial passage of time. Natural passage of time may refer to a naturally occurring passage of time. Artificial passage of time may refer to any other passage of time or representation of passage of time, including a user-controlled representation of passage of time.

In certain embodiments, radial time facility 170 may be configured to provide at least one tool configured to facilitate representation of user-controlled passage of time ("artificial time"). As mentioned, MAG window 550 may comprise a selectable object that may be selected and moved (e.g., dragged) along horizon 540 by a user. In some implementations, MAG window 550 may comprise a selectable touch object displayed on a touch screen display and configured to be selected and moved to various positions along horizon 540. As MAG window 550 is moved along horizon 540 in response to user input, timeline 510 may scroll (e.g., wind and unwind) accordingly. Hence, the movement of timeline 510 and MAG window 550 illustrated in FIG. 6 may represent an artificial passage of time and may be performed in response to user input (e.g., a user dragging MAG window 550 from left to right along horizon 540).

Where a display of timeline 510 and/or MAG window 550 in GUI 410 represents an artificial position of time, radial time facility 170 may be configured to automatically "time out" from the display of a representation of artificial time after a predetermined period of time without receiving user input. Upon timeout, GUI 410 may revert to a display of timeline 510 and/or MAG window 550 representative of natural time (e.g., an actual current time). Accordingly, a user may scroll timeline 510 forward or backward in time artificially, and GUI 410 may revert to a representation of natural time after the user is finished scrolling timeline 510.

Figure 7:
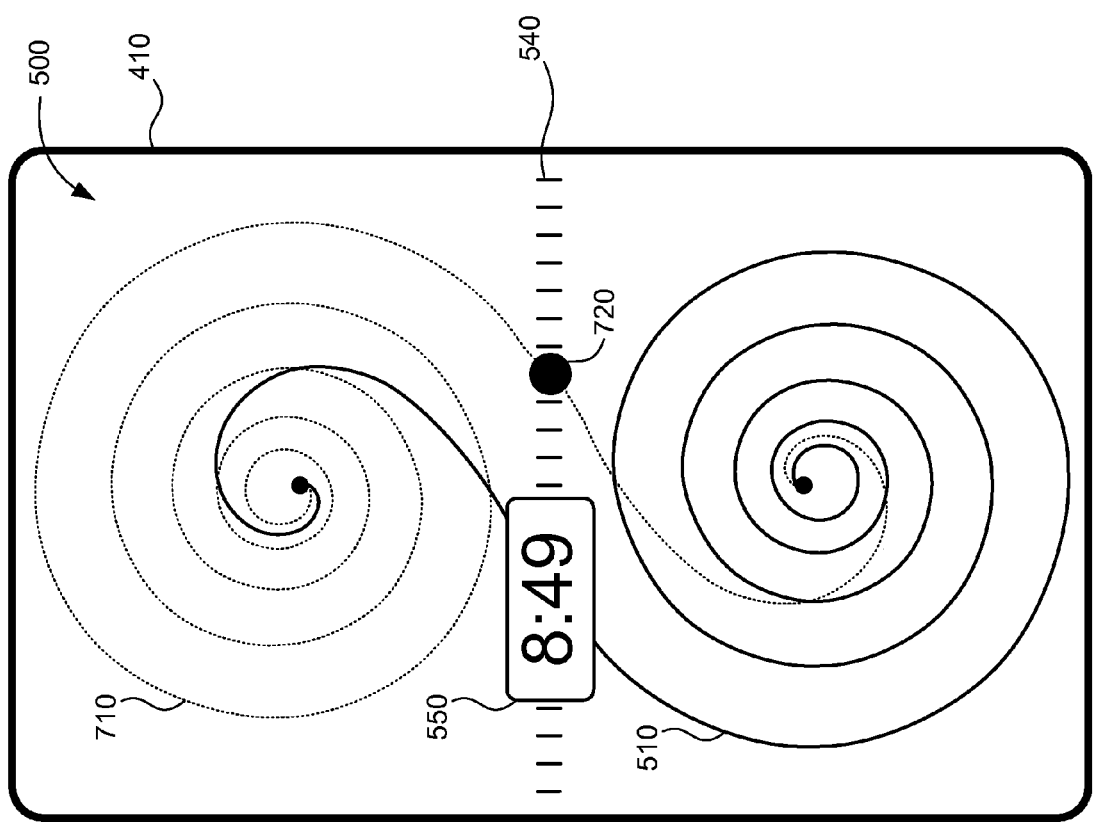
FIG. 7 illustrates a timeline and a ghosted timeline displayed together in a GUI.

In certain embodiments, GUI 410 may be configured to display natural and artificial representations of time together. For example, a user may drag MAG window 550 along horizon 540, and timeline 510 may represent an artificial representation of time based on the user input. In addition to timeline 510, GUI 410 may display a representation of natural time, such as a second timeline representative of actual current time. As an example, FIG. 7 illustrates an exemplary GUI view in GUI 410 and in which timeline 510 and MAG window 550 represent a point in time in the past, and a second timeline 710 and point 720 represent actual current time. In FIG. 7, timeline 510 is represented as a solid line, and the second timeline 710 is represented as a ghosted, broken line.

GUI 410 may initially display a GUI view having a timeline 510 and MAG window 550 positioned to represent the actual current time. A user may select and draft MAG window 550 from right to left (i.e., backwards in time) to the position along horizon 540 shown in FIG. 7. In response to this user input, timeline 510 may scroll and MAG window 550 may move to arrive at the positions shown in FIG. 7. The initial position of timeline 510 and MAG window 550 prior to receipt of the user input may be represented as second timeline 710 and point 720, respectively. The second timeline 710 and point 720 may be configured to dynamically update in the background based on a natural passage of time. Accordingly, a user may artificially scroll through timeline 510 while also being able to view a representation of the actual current time in GUI 410.

In some examples, as a user moves MAG window 550 from right to left to scroll backward in time, an area of GUI 410 below horizon 540 and associated with future time may darken to indicate a scroll direction that is backward in time. Conversely, when a user scrolls forward in time, an area of GUI 410 above horizon 540 and associated with past time may darken to indicate a scroll direction that is forward in time.

The GUI view shown in FIG. 7 may be configured to "time out" after a predetermined period of time without user input and revert to a GUI view in which timeline 510 and MAG window 550 are representative of the actual current time. In other examples, a GUI view showing a representation of artificial time (e.g., the GUI view shown in FIG. 7) may be configured to revert to a GUI view showing a representation of natural time after a user releases MAG window 550.

Figure 8:
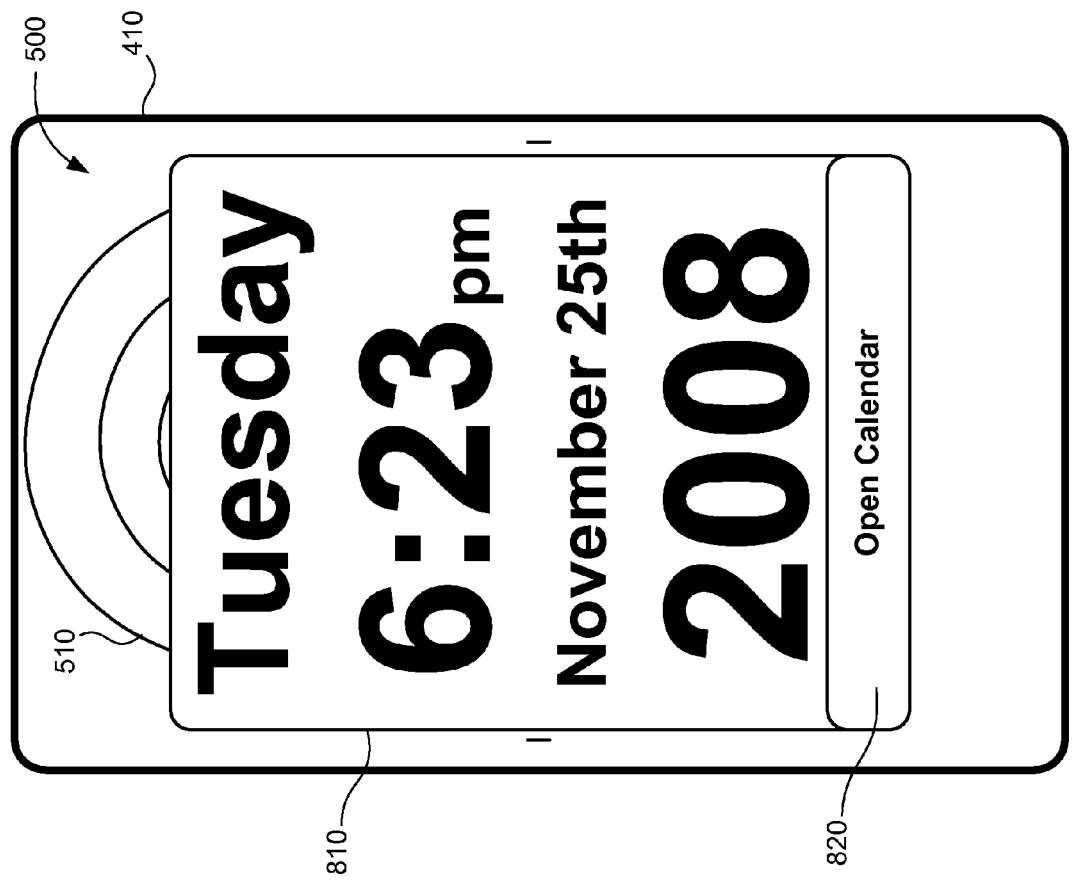
FIG. 8 illustrates an expanded magnification window displayed in a GUI.

Alternative or in addition to MAG window 550 being selected and dragged along horizon 540, MAG window 550 may be selectable in one or more other ways to elicit one or more other actions. For example, MAG window 550 may include a selectable and expandable touch screen object that when tapped by a physical object (e.g., a finger or thumb) may expand in GUI 410. FIG. 8 illustrates an expanded MAG window 810 in GUI 410. As shown, expanded MAG window 810 may include information descriptive of the actual current time, including indicators of the current day, time, month, date, and year. Alternative or in addition to such information, expanded MAG window 810 may include one or more selectable options associated with one or more operations. In FIG. 8, expanded MAG window 810 includes a selectable option 820 for launching a calendar application (e.g., such as may be included in calendar facility 160). In response to a user selection of selectable option 820, a calendar view may be displayed in GUI 410. In certain embodiments, expanded MAG window 810 may be tapped by a physical object. In response, expanded MAG window 810 may revert to MAG window 550.

Figure 9A:
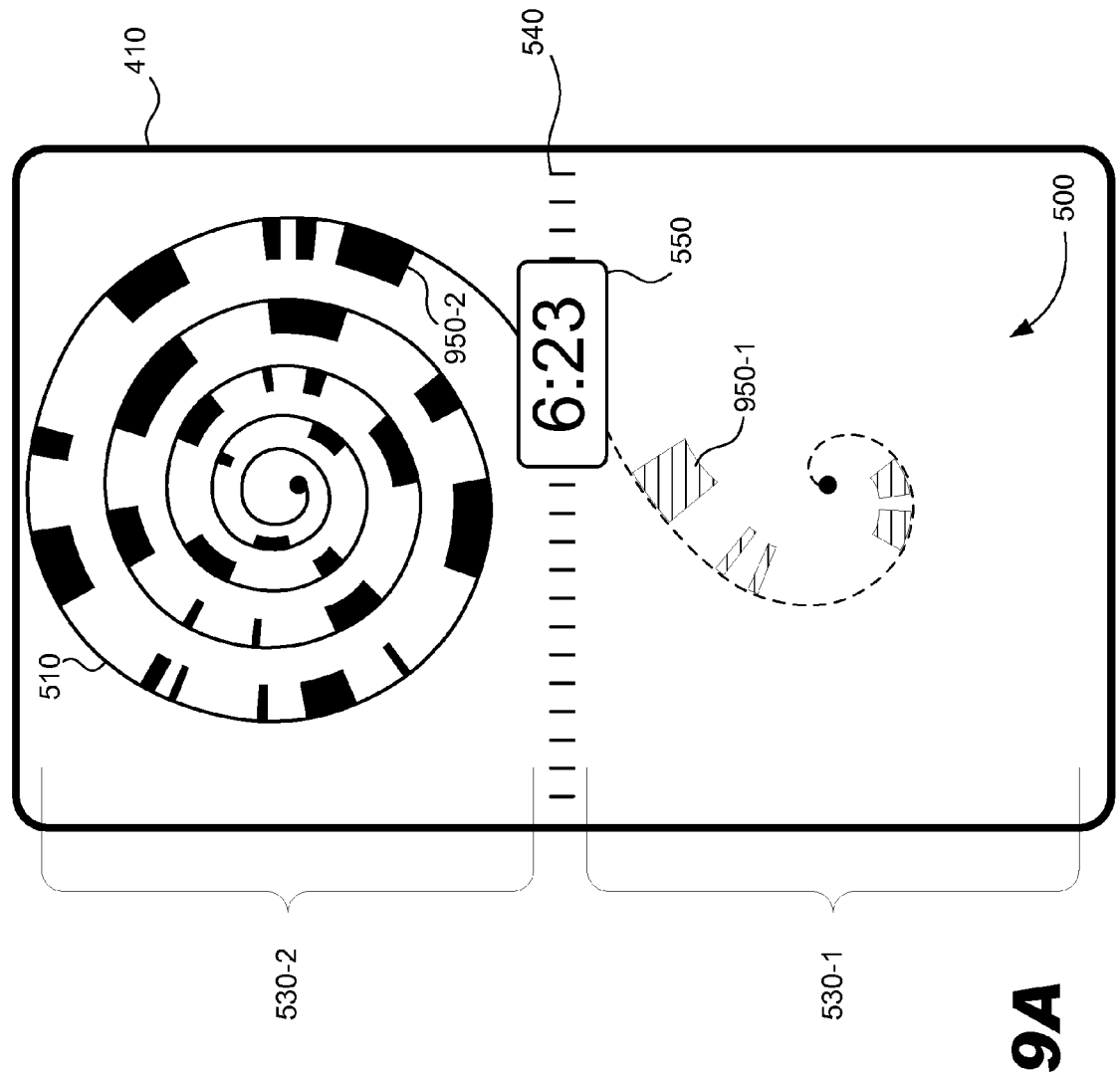
FIG. 9A illustrates graphical objects representative of events displayed together with the radial configuration of FIG. 5 in a GUI.

One or more graphical objects representative of one or more events, including any of the events and/or types of events described above, may be displayed together with radial configuration 500 in GUI 410. FIG. 9A illustrates a plurality of graphical objects representative of a plurality of events displayed in GUI 410. In the illustrated example, such graphical objects include a plurality of tabs. For illustrative purposes, two of the tabs are identified and referred to herein as tabs 950-1 and 950-2, as shown in FIG. 9A. However, the tabs shown in FIG. 9A are collectively referred to herein as "tabs 950."

Tabs 950 may be positioned in GUI 410 relative to the radial configuration 500 of time based information. In particular, tabs 950 may be positioned at certain locations along timeline 510. This may represent relationships between events represented by the tabs 950 and time based information represented by points along timeline 510. For example, tab 950-1 is positioned at a location adjacent to a segment of timeline 510 and indicating a relationship between an event represented by tab 950-1 and a range of time represented by the segment of the timeline 510. Tab 950-2 is positioned at another location adjacent to another segment of timeline 510 and indicating a relationship between an event represented by tab 950-2 and another range of time represented by the other segment of the timeline 510.

Tabs 950 may represent events of distinct types, which may be visually delineated in GUI 410. For example, tabs 950 may include one or more visual indicators indicating events types. Event types may be visually depicted by visual indicators in any suitable way, including by tabs 950 having certain colors (e.g., hue, saturation, intensity, etc.), shades, patterns, sizes, contrasts, text, symbols, and any other visually discernible indicators. In FIG. 9A, past events and future events are visually distinguished from one another by visual attributes of tabs 450 representative of the events. For example, tab 950-1, which represents a future event, is positioned adjacent to and to the right of timeline 510. Tab 950-1 may further include a particular color or pattern as indicated by a pattern of horizontal lines within tab 950-1. One or more of these attributes of tab 950-1 may be configured to indicate that tab 950-1 represents a future event. In contrast, tab 950-2, which represents a past event, is positioned adjacent to and to the left of timeline 510. Tab 950-2 may further include a particular color or pattern as indicated by a solid black fill color within tab 950-2. One or more of these attributes of tab 950-2 may be configured to indicate that tab 950-2 represents a past event.

The above example is illustrative only. Other event types may be visually indicated in GUI 410. For example, the plurality of graphical objects representative of events and displayed at various positions along timeline 510 in GUI 410 may be divided into subsets, which division may be visually indicated in GUI 410. For instance, a first subset of the graphical objects may represent a first subset of events (e.g., future events) and may be positioned along the first section 530-1 of timeline 510, and a second subset of the graphical objects may represent a second subset of events (e.g., past events) and may be positioned along the second section 530-2 of timeline 510 in GUI 410. In other words, the first subset of graphical objects may be visually associated with the first section 530-1 of timeline 510 and the second subset of graphical objects may be visually associated with the second section 530-2 of timeline in GUI 410.

In certain embodiments, one or more of the tabs 950 in GUI 410 may be user selectable. Accordingly, a user of a device (e.g., device 200) may select a particular tab (e.g., tab 950-2) displayed in GUI 410. The selection may be made in any suitable way and using any suitable form of user input, including any of the ways described above. One or more predetermined actions may be performed in response to a user selection of tab 950-2. In certain embodiments, for example, tab 950-2 may be expandable and may expand to reveal event information in response to a user selection. The information in the expanded tab 950-2 may be displayed in any suitable way, including within the context of the radial configuration 500 of time based information.

Expansion of a selected tab 950-2 is illustrative of an action that may be performed in response to a user selection of tab 950-2. Other actions may be performed in other embodiments in response to user selections of tabs 950. In certain embodiments, for example, tab 950-2 may comprise a link to a particular GUI view and/or an application associated with an event. For instance, a user selection of tab 950-2 may launch or otherwise access communication facility 110 or calendar facility 160, which may access and provide a communication view or calendar view showing a communication event or calendar event associated with tab 950-2. That is, selection of tab 950-2 may navigate a user directly to a communication view or calendar view including a communication event or calendar event associated with tab 950-2.

Figure 9B:
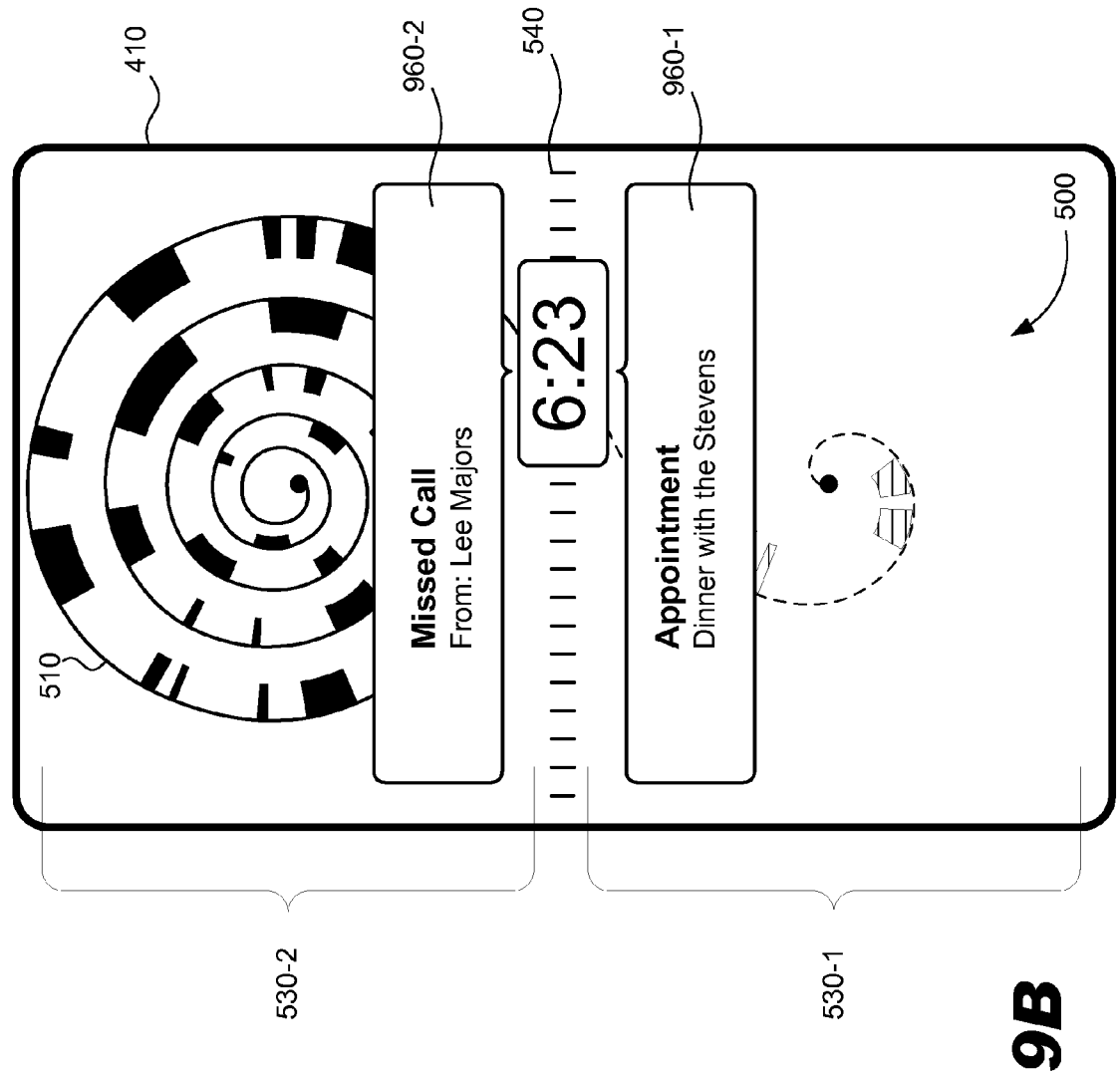
FIGS. 9B-9D illustrate exemplary pop-up windows displayed together with a radial configuration of time based information in a GUI.

In certain embodiments, a pop-up window including additional information related to an event may be displayed in GUI 410. The pop-up window may be displayed in response to a user selection of a tab 950 or in response to another trigger such as proximity of a tab 950 to horizon 540, for example. FIG. 9B illustrates exemplary pop-up windows 960-1 and 960-2 that may be displayed in GUI 410 together with radial configuration 500. As shown, each of the pop-up windows 960-1 and 960-2 may include additional information about an event. In the illustrated example, pop-up window 960-1 includes information related to a calendar event (e.g., an appointment for dinner at the Stevens), and pop-up window 960-2 includes information related to a communication event (e.g., a missed call from Lee Majors).

In certain embodiments, pop-up windows 960-1 and 960-2 may be displayed based on the proximity of tabs 950 representative of events to horizon 540. That is, as events converge with the horizon 540, information about the events may be displayed in one or more pop-up windows (e.g., pop-up windows 960-1 and 960-2). For example, pop-up window 960-1 may be displayed when tab 950-1 is representative of the next future event that will reach horizon 540. Similarly, pop-up window 960-2 may be displayed when tab 950-2 is representative of a present event at horizon 540 or of the past event that most recently passed through horizon 540. In the example shown in FIG. 9B, pop-up windows 960-1 and 960-2 respectively represent a future event and a past event that are nearest to the horizon 540. Pop-up window 960-1 may be displayed below horizon 540 when associated with a future event, and pop-up window 960-2 may be displayed above horizon 540 when associated with a past event, as shown in FIG. 9B.

Figure 9C:
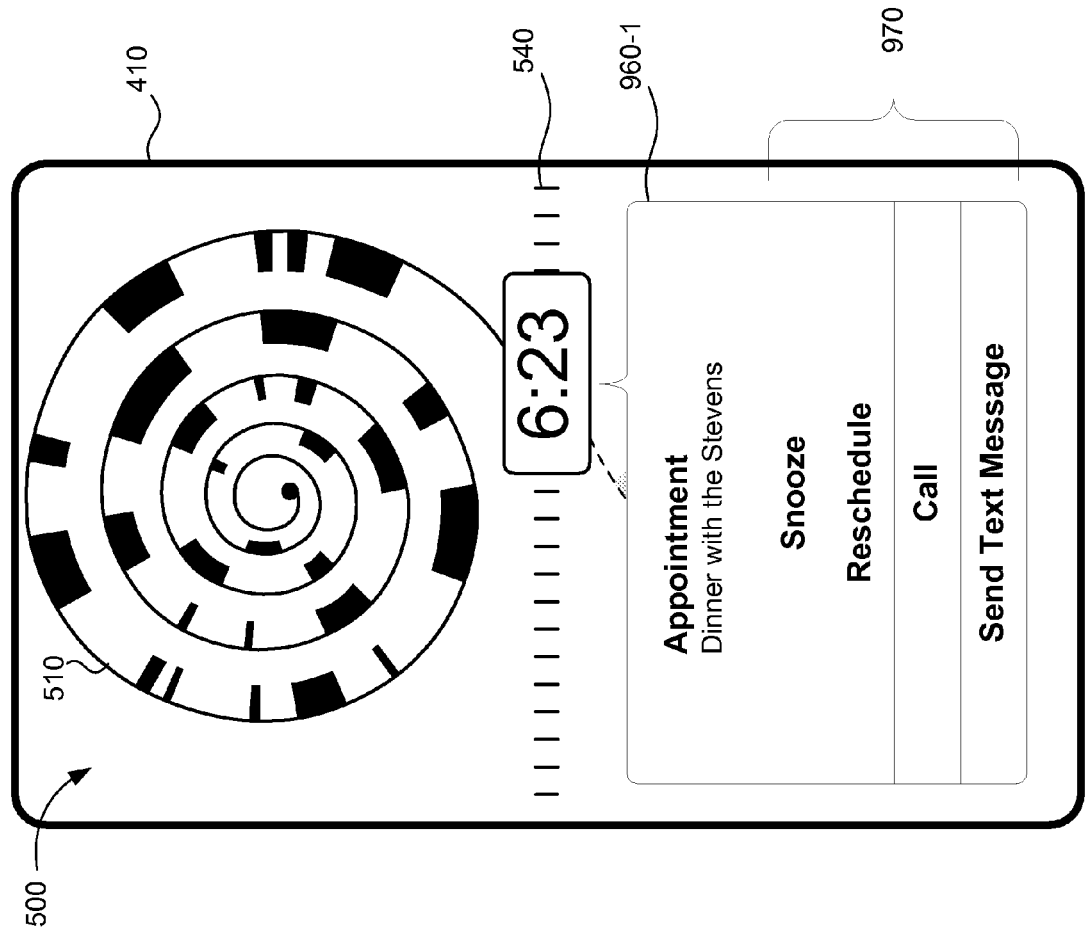

A pop-up window may be user selectable, and one or more actions may be performed in response to selection of a pop-up window. For example, a user may select pop-up window 960-1 displayed in GUI 410 (e.g., a user may tap a finger or other physical object on the displayed pop-up window 960-1). In response, a set of contextual menu options may be displayed in GUI. For example, FIG. 9C illustrates pop-up window 960-1 expanded to reveal a set of contextual menu options 970. In the illustrated examples, the menu options 970 include a "snooze" option for postponing an appointment in calendar facility 160, a "reschedule" option for rescheduling an appointment, a "call" option for initiating a voice call to a contact (e.g., the Stevens) associated with an appointment, and a "send text message" option for initiating a text message address to a contact associated with an appointment. A user may select one of the menu options 170 to initiate one or more associated actions. The options shown in FIG. 9C are associated with communication operations that may be performed by communication facility 110 and calendar operations that may be performed by calendar facility 160. The options shown in FIG. 9C are illustrative only. Other options may be included in other embodiments.

Figure 9D:
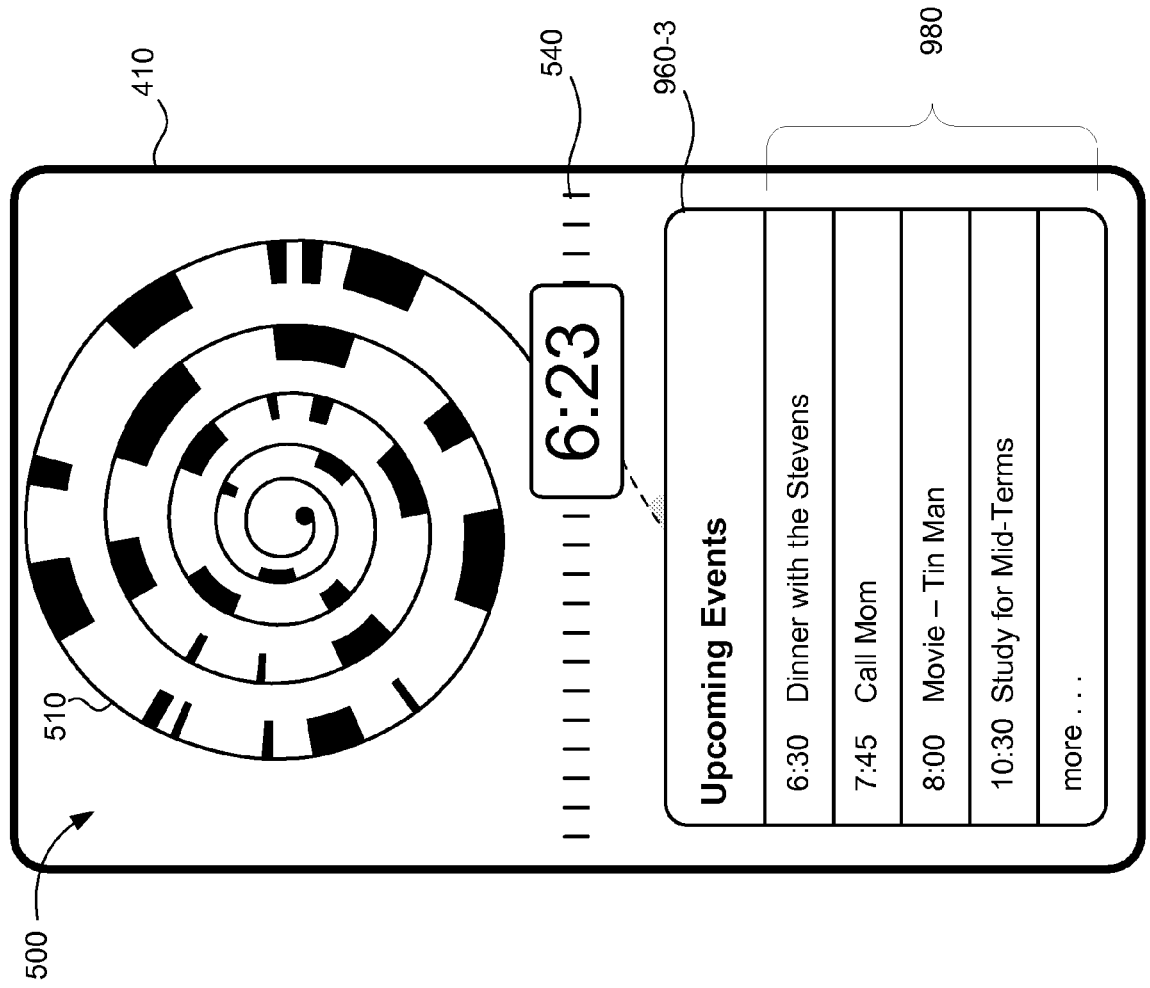

FIG. 9D illustrates another exemplary pop-up window 960-3 that may be displayed together with radial configuration 500 in GUI 410. As shown, pop-up window 960-3 may include a list 980 of upcoming future events represented by tabs 950 positioned relative to the first section 530-1 of timeline 510. Pop-up window 960-3 may include information about the upcoming future events. In certain embodiments, one or more of the events in list 980 may be user selectable. A user selection of one of the events in list 980 may trigger a display of a GUI view (e.g., a calendar event view) associated with the event.

In certain examples, the GUI view shown in FIG. 9D may be displayed in response to a user selection of axis point 520-1 or the first section 530-1 of timeline 510 in the GUI view shown in FIG. 9A. Similarly, a pop-up window including a list of past events may be displayed in response to a user selection of axis point 520-2 or the second section 530-2 of timeline 510.

In certain embodiments, timeline 510 and/or tabs 950 positioned along timeline 510 may be scaled in size based on a relationship of timeline 510 and/or tabs 950 to an axis point 520 about which timeline 510 is wound. For example, tabs 950 positioned along a segment of timeline 510 that is proximate to the axis point may a smaller in size as compared to tabs 950 positioned along a segment of timeline 510 that is not as proximate to the axis point. The scaling in size may be accomplished in any suitable way. For example, the axis point may be defined to be located at a distance on a z-axis perceptively further away from horizon 540. This may accommodate a scaling down of tabs 950 and/or timeline 510 that are displayed at positions relatively further away in time from a present time.

Separate timelines may be displayed together in a GUI 410. For example, another timeline may be displayed spirally coiled within the sprirally coiled timeline 510 shown in FIG. 9A. This may allow a user to view separate timelines associated with separate groups of events side-by-side in a GUI 410. For example, timeline 510 and tabs 950 positioned along timeline 510 as shown in FIG. 9A may represent a group of events from a first calendar (e.g., a "work" calendar). Another timeline and set of tabs 950 may be displayed together with timeline 510, such as by being coiled within timeline 510. The other timeline and set of tabs may represent another group of events from a second calendar (e.g., a "personal" or "family" calendar). In this or similar manner, events from separate calendars may be displayed together for concurrent and convenient viewing by a user.

While the exemplary GUIs and GUI views described above are illustrated in particular ways in the drawings, the examples are illustrative only. In particular, sizes of the elements in a GUI or GUI view may be modified. In certain embodiments, for example, any of the GUI views illustrated in the drawings and/or described above may be in icon and/or widget form within a GUI. As an example, any of the GUI views described above may be displayed in icon and/or widget form on a display of a mobile phone device.

Figure 10:
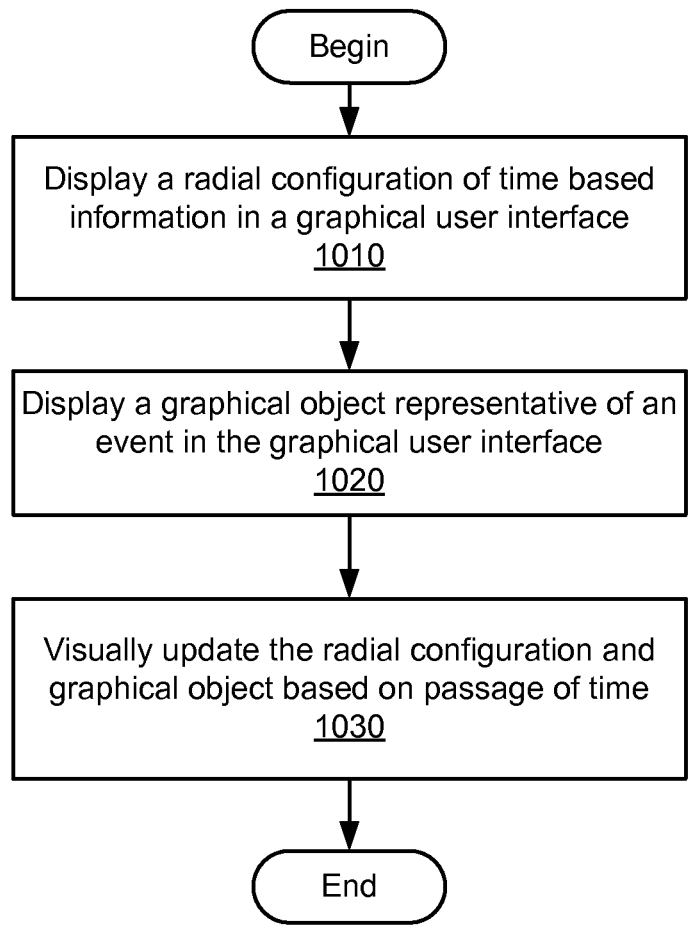
FIG. 10 illustrates an exemplary method for radial display of time based information.

FIG. 10 illustrates an exemplary method for radial display of time based information. While FIG. 10 illustrates exemplary steps according to one embodiment, other embodiments may omit, add to, reorder, and/or modify any of the steps shown in FIG. 10.

In step 1010, a radial configuration of time based information is displayed in a GUI. Step 1010 may be performed in any of the ways described above, including radial time facility 170 generating and providing data representative of the radial configuration to user interface facility 180 for display by I/O facility 140.

In step 1020, a graphical object representative of an event is displayed in the GUI. Step 1020 may be performed in any of the ways described above, including radial time facility 170 generating and providing data representative of the graphical object to user interface facility 180 for display by I/O facility 140. As described above, the graphical object may be positioned relative to the radial configuration in the GUI, and the relative position of the graphical object to the radial configuration may visually indicate a relationship between the event represented by the graphical object and the time based information represented by the radial configuration.

In step 1030, the display of the radial configuration and the graphical object is updated in the GUI based on a passage of time. Step 1030 may be performed in any of the ways described above, including radial time facility 170 generating and providing data representative of one or more updated graphical objects to user interface facility 180 for display by I/O facility 140. In certain embodiments, the updating including scrolling timeline 510 forward or backward in time and moving graphical objects representative of events along with the scrolling timeline. In other embodiments, the updating includes changing colors in a color band and/or associated with graphical objects representative of events.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    displaying by a computing system of a radial configuration of time based information in a graphical user interface of said computing system, said radial configuration of time based information comprising a radial timeline;
    displaying by said computing system of a graphical object representative of an event along a segment of said radial timeline in said graphical user interface, wherein a position of said graphical object along said segment of said radial timeline indicates a particular range of time associated with said event;
    graphically scrolling by said computing system of said radial timeline within said graphical user interface based on a natural passage of time; and
    moving by said computing system of said graphical object in conjunction with said scrolling of said radial timeline within said graphical user interface.

2. The method of claim 1, wherein said radial timeline is spirally disposed about at least one axis point.

3. The method of claim 1, wherein said graphical object is one of a plurality of graphical objects representative of a plurality of events of distinct types, and wherein said method further comprises:
    displaying by said computing system of said plurality of graphical objects in said graphical user interface, said plurality of graphical objects including a plurality of visual indicators indicating said distinct types.

4. The method of claim 3, wherein said plurality of events of distinct types includes at least two of a communication event, a calendar event, a past event, a present event, and a future event.

5. The method of claim 1, further comprising:
    detecting by said computing system of a user selection of said graphical object; and
    displaying by said computing system of information descriptive of said event in said graphical user interface in response to said user selection of said graphical object.

6. The method of claim 1, further comprising displaying by said computing system of a pop-up window in said graphical user interface, said pop-up window including at least one of information descriptive of said event and a plurality of selectable options associated with said event.

7. The method of claim 1, further comprising visually modifying by said computing system of said graphical object based on a proximity of said graphical object to a position representative of present time in said radial configuration of time based information.

8. The method of claim 1, wherein said radial timeline comprises a first section spirally disposed about a first axis point and a second section spirally disposed about a second axis point.

9. The method of claim 8, wherein said first section of said radial timeline represents future time based information and said second section of said radial timeline represents past time based information, and wherein said first section and said second section of said radial timeline are connected together at a location representing present time based information.

10. The method of claim 9, further comprising displaying by said computing system of graphics representative of a horizon between said first section and said second section of said radial timeline, said location positioned along said horizon, wherein said horizon comprises a linear timeline representative of a same time period as represented by said radial timeline.

11. The method of claim 10, further comprising displaying by said computing system of a selectable object at said location, said selectable object being moveable along said horizon.

12. The method of claim 1, tangibly embodied as computer-executable instructions on at least one computer-readable medium.

13. The method of claim 1, wherein said particular range of time associated with said event comprises a starting time of said event and an ending time of said event.

14. A method comprising:
    displaying by a computing system of a radial configuration of time based information in a graphical user interface of said computing system, said radial configuration of time based information including a timeline having a first section spirally coiled about a first axis point and a second section spirally coiled about a second axis point;
    displaying by said computing system of a plurality of graphical objects representative of a plurality of events adjacent to various positions along said timeline; and
    graphically scrolling by said computing system of said timeline within said graphical user interface based on a natural passage of time;
    wherein said positions of said graphical objects adjacent to said timeline indicate particular ranges of time associated with said events and are configured to move in conjunction with said scrolling of said timeline based on said natural passage of time.

15. The method of claim 14, wherein said first section of said timeline represents future time based information and said second section of said timeline represents past time based information.

16. The method of claim 14, wherein said plurality of graphical objects representative of said plurality of events includes a first subset of said graphical objects representative of a first subset of said events and a second subset of said graphical objects representative of a second subset of said events, said first subset of said events being future events and said second subset of said events being past events.

17. The method of claim 16, wherein said first subset of said graphical objects are visually distinguished from said second subset of said graphical objects in said graphical user interface.

18. The method of claim 16, wherein said first subset of said graphical objects are visually associated with said first section of said timeline and said second subset of said graphical objects are visually associated with said second section of said timeline in said graphical user interface.

19. The method of claim 14, wherein said scrolling of said timeline comprises an unwinding of said first section spirally coiled about said first axis point and a winding of said second section spirally coiled about said second axis point.

20. The method of claim 14, wherein said scrolling of said timeline graphically represents said natural passage of time in said graphical user interface.

21. The method of claim 14, further comprising scaling by said computing system one or more sizes of one or more of said graphical objects in said graphical user interface based on one or more proximities of said one or more of said graphical objects to at least one of said first axis point and said second axis point.

22. A system comprising:
    a user interface facility configured to provide a graphical user interface for display; and
    a radial time facility comprising at least one physical processor configured to
        provide data representing a radial configuration of time based information to said user interface facility for display in said graphical user interface, said radial configuration of time based information comprising a radial timeline,
        provide data representing a graphical object representative of an event to said user interface facility for display along a segment of said radial timeline in said graphical user interface, wherein a position of said graphical object along said segment of said radial timeline indicates a particular range of time associated with said event,
        direct said user interface facility to graphically scroll said radial timeline within said graphical user interface based on a natural passage of time, and
        direct said user interface facility to move said graphical object in conjunction with said scrolling of said radial timeline within said graphical user interface.

23. The system of claim 22 implemented on a mobile phone device.

\* \* \* \* \*